(12) United States Patent
Holzhauer et al.

(10) Patent No.: US 11,627,151 B2
(45) Date of Patent: Apr. 11, 2023

(54) INDUSTRIAL ASSET CYBER-ATTACK DETECTION ALGORITHM VERIFICATION USING SECURE, DISTRIBUTED LEDGER

(71) Applicant: General Electric Company, Schenectady, NY (US)

(72) Inventors: Daniel Francis Holzhauer, Burnt Hills, NY (US); Lalit Mestha, North Colonie, NY (US); Justin John, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 16/176,293

(22) Filed: Oct. 31, 2018

(65) Prior Publication Data

US 2020/0137090 A1     Apr. 30, 2020

(51) Int. Cl.
*H04L 9/32* (2006.01)
*H04L 9/40* (2022.01)
*H04L 9/00* (2022.01)

(52) U.S. Cl.
CPC ........ *H04L 63/1425* (2013.01); *H04L 9/3236* (2013.01); *H04L 9/50* (2022.05)

(58) Field of Classification Search
CPC ............... H04L 63/1425; H04L 9/3236; H04L 2209/38; H04L 9/3239; H04L 63/1416;
(Continued)

(56) References Cited

U.S. PATENT DOCUMENTS

| | | | |
|---|---|---|---|
| 7,103,772 B2 | 9/2006 | Joregensen et al. | |
| 9,697,355 B1* | 7/2017 | Park | G06F 21/554 |
| 9,756,062 B2* | 9/2017 | Dekel | G06F 21/554 |
| 9,864,864 B2* | 1/2018 | Luo | H04L 63/20 |

(Continued)

FOREIGN PATENT DOCUMENTS

EP    3285248 A1    2/2018

OTHER PUBLICATIONS

Naveen Joshi, "Blockchain technology for improvised cyber security", Artical of Allerin, found in https://www.allerin.com/blog/blockchain-technology-for-improvised-cyber-security, Jul. 2017, 5pgs.
Ravindra, Savaram "The Role of Blockchain in Cybersecurity", Artical of Infosecurity Group, Jan. 2018, 3pgs.

*Primary Examiner* — Saleh Najjar
*Assistant Examiner* — Nhan Huu Nguyen
(74) *Attorney, Agent, or Firm* — Buckley, Maschoff & Talwalkar LLC

(57) ABSTRACT

A verification platform may include a data connection to receive a stream of industrial asset cyber-attack detection algorithm data, including a subset of the industrial asset cyber-attack detection algorithm data. The verification platform may store the subset into a data store (the subset of industrial asset cyber-attack detection algorithm data being marked as invalid) and record a hash value associated with a compressed representation of the subset of industrial asset cyber-attack detection algorithm data combined with metadata in a secure, distributed ledger. The verification platform may then receive a transaction identifier from the secure, distributed ledger and mark the subset of industrial asset cyber-attack detection algorithm data in the data store as being valid after using the transaction identifier to verify that the recorded hash value matches a hash value of an independently created version of the compressed representation of the subset of industrial asset cyber-attack detection algorithm data combined with metadata.

20 Claims, 36 Drawing Sheets

(58) Field of Classification Search
CPC ...... H04W 12/009; G06F 21/55; G06F 21/50; G06F 21/60; G06F 21/62
See application file for complete search history.

(56) References Cited

U.S. PATENT DOCUMENTS

| | | | | |
|---|---|---|---|---|
| 9,930,058 | B2* | 3/2018 | Carpenter | H04L 43/04 |
| 9,965,628 | B2 | 5/2018 | Ford et al. | |
| 10,027,699 | B2* | 7/2018 | Wei | G06F 21/552 |
| 10,234,853 | B2* | 3/2019 | Mukkamala | G06F 3/04847 |
| 10,491,624 | B2* | 11/2019 | Ng | G06Q 40/08 |
| 10,819,742 | B2* | 10/2020 | Ogawa | H04L 67/12 |
| 10,956,567 | B2* | 3/2021 | Ogawa | G05B 19/0428 |
| 2005/0231350 | A1* | 10/2005 | Littrell | G01H 1/006 340/511 |
| 2013/0212669 | A1* | 8/2013 | Wilson | H04L 63/1416 726/12 |
| 2013/0291115 | A1* | 10/2013 | Chong | H04L 67/12 726/25 |
| 2014/0137257 | A1* | 5/2014 | Martinez | H04L 63/1433 726/25 |
| 2015/0143500 | A1* | 5/2015 | Chong | H04L 9/321 726/9 |
| 2015/0363777 | A1 | 12/2015 | Ronca et al. | |
| 2016/0050225 | A1* | 2/2016 | Carpenter | G06F 21/577 726/25 |
| 2016/0065603 | A1* | 3/2016 | Dekel | H04L 63/1425 726/23 |
| 2016/0085972 | A1* | 3/2016 | Luo | H04L 63/10 713/153 |
| 2016/0283920 | A1* | 9/2016 | Fisher | H04L 9/3297 |
| 2016/0359825 | A1* | 12/2016 | Chand | H04L 63/145 |
| 2017/0149811 | A1* | 5/2017 | Corrales | H04L 63/1425 |
| 2017/0169219 | A1* | 6/2017 | Ogawa | G06Q 30/02 |
| 2017/0171243 | A1* | 6/2017 | Ogawa | G05B 19/048 |
| 2017/0192414 | A1* | 7/2017 | Mukkamala | H04L 63/0876 |
| 2017/0264629 | A1* | 9/2017 | Wei | H04L 63/1433 |
| 2017/0270295 | A1* | 9/2017 | Park | G06F 21/552 |
| 2017/0310690 | A1* | 10/2017 | Mestha | G06F 21/55 |
| 2017/0330180 | A1 | 11/2017 | Song et al. | |
| 2017/0366516 | A1* | 12/2017 | Pattanaik | H04L 63/0428 |
| 2018/0004948 | A1* | 1/2018 | Martin | G06F 21/552 |
| 2018/0096153 | A1* | 4/2018 | DeWitte | G06F 16/9535 |
| 2018/0136633 | A1* | 5/2018 | Small | G06Q 20/065 |
| 2018/0144114 | A1 | 5/2018 | Fiske | |
| 2018/0157688 | A1* | 6/2018 | Zessin | G06F 16/2219 |
| 2018/0176022 | A1 | 6/2018 | Piron et al. | |
| 2018/0205552 | A1* | 7/2018 | Struttmann | G06F 16/9024 |
| 2018/0219676 | A1* | 8/2018 | Mattingly | H04L 63/08 |
| 2019/0087598 | A1* | 3/2019 | Adkins | G06F 21/121 |
| 2019/0227515 | A1* | 7/2019 | Fink | G06Q 10/087 |
| 2019/0288847 | A1* | 9/2019 | Beckmann | G06F 16/2246 |
| 2019/0312840 | A1* | 10/2019 | Dhakshinamoorthy | H04L 67/12 |
| 2019/0340269 | A1* | 11/2019 | Biernat | G06F 16/27 |
| 2020/0066072 | A1* | 2/2020 | Galvez | H04L 9/0637 |

\* cited by examiner

INDUSTRIAL ASSET CYBER-ATTACK DETECTION ALGORITHM VERIFICATION USING SECURE, DISTRIBUTED LEDGER

BACKGROUND

Some embodiments disclosed herein relate to industrial assets and, more particularly, to systems and methods to verify industrial data using a secure, distributed ledger.

Recent technological advancements have resulted in increased connectivity with respect to the industrial space. With the emergence of smart devices and the industrial internet, among other technologies, the ability to improve the operation of systems (e.g., factories) and industrial assets very quickly based on large amounts of data, much of it gathered from interconnected sensors, has improved substantially. For example, the performance of gas turbines, jet engines, etc. may be monitored to improve performance and avoid malfunctions. However, these benefits may also have adverse consequences. For example, numerous vulnerabilities in industrial systems might be utilized by unauthorized parties to compromise the industrial assets. Consider sensor data from oil pipelines, water pressure systems, gas turbines, and other industrial equipment that could be altered to give false readings or corrupted data. The result of such alterations might cause both automatic controllers and human operators to take improper corrective actions. These actions might lead to substantial confusion in the community as well as increase the operating costs of plants and factories.

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Current methods primarily consider attack detection in Information Technology ("IT," such as, computers that store, retrieve, transmit, manipulate data) and Operation Technology ("OT," such as direct monitoring devices and communication bus interfaces). Cyber-attacks can still penetrate through these protection layers and reach the physical "domain" as seen in 2010 with the Stuxnet attack. Such attacks can diminish the performance of a control system and may cause total shut down or even catastrophic damage to a plant. Currently, no methods are available to automatically detect, during a cyber-incident, attacks at the domain layer where sensors, controllers, and actuators are located. In some cases, multiple attacks may occur simultaneously (e.g., more than one actuator, sensor, or parameter inside control system devices might be altered maliciously by an unauthorized party at the same time). Note that some subtle consequences of cyber-attacks, such as stealthy attacks occurring at the domain layer, might not be readily detectable (e.g., when only one monitoring node, such as a sensor node, is used in a detection algorithm). It may also be important to determine when a monitoring node is experiencing a fault (as opposed to a malicious attack) and, in some cases, exactly what type of fault is occurring. Existing approaches to protect an industrial control system, such as failure and diagnostics technologies, may not adequately address these problems—especially when multiple, simultaneous attacks and/faults occur since such multiple faults/failure diagnostic technologies are not designed for detecting stealthy attacks in an automatic manner. It would therefore be desirable to protect a cyber-physical system from cyber-attacks in an automatic and accurate manner even when attacks percolate through the IT and OT layers and directly harm control systems.

To avoid such consequences, a centralized architecture might utilize a database storing hash values that can be used to verify industrial data. However, because there is a single master copy or database where everything is stored, a single compromised element within the architecture could put the entire system at risk and allow data to be manipulated or corrupted. It would therefore be desirable to provide systems and methods to efficiently and accurately facilitate industrial asset cyber-attack detection algorithm verification.

SUMMARY

According to some embodiments, a verification platform may include a data connection to receive a stream of industrial asset cyber-attack detection algorithm data, including a subset of the industrial asset cyber-attack detection algorithm data. The verification platform may store the subset into a data store (the subset of industrial asset cyber-attack detection algorithm data being marked as invalid) and record a hash value associated with a compressed representation of the subset of industrial asset cyber-attack detection algorithm data combined with metadata in a secure, distributed ledger. The verification platform may then receive a transaction identifier from the secure, distributed ledger and mark the subset of industrial asset cyber-attack detection algorithm data in the data store as being valid after using the transaction identifier to verify that the recorded hash value matches a hash value of an independently created version of the compressed representation of the subset of industrial asset cyber-attack detection algorithm data combined with metadata.

Some embodiments comprise: means for receiving, at a computer processor of a verification platform, a stream of industrial asset cyber-attack detection algorithm data, including a subset of the industrial asset cyber-attack detection algorithm data; means for storing, by the verification platform, the subset of industrial asset cyber-attack detection algorithm data into a data store, the subset of industrial asset cyber-attack detection algorithm data being marked as invalid; means for recording, by the verification platform, a hash value associated with a compressed representation of the subset of industrial asset cyber-attack detection algorithm data combined with metadata in a secure, distributed ledger; means for receiving, at the verification platform, a transaction identifier from the secure, distributed ledger; and means for marking the subset of industrial asset cyber-attack detection algorithm data in the data store as being valid after using the transaction identifier to verify, at the verification platform, that the recorded hash value matches a hash value associated with an independently created version of the compressed representation of the subset of industrial asset cyber-attack detection algorithm data combined with metadata.

Technical effects of some embodiments of the invention may include improved and computerized ways to efficiently and accurately facilitate industrial asset cyber-attack detection algorithm verification. With these and other advantages and features that will become hereinafter apparent, a more complete understanding of the nature of the invention can be obtained by referring to the following detailed description and to the drawings appended hereto.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers'specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
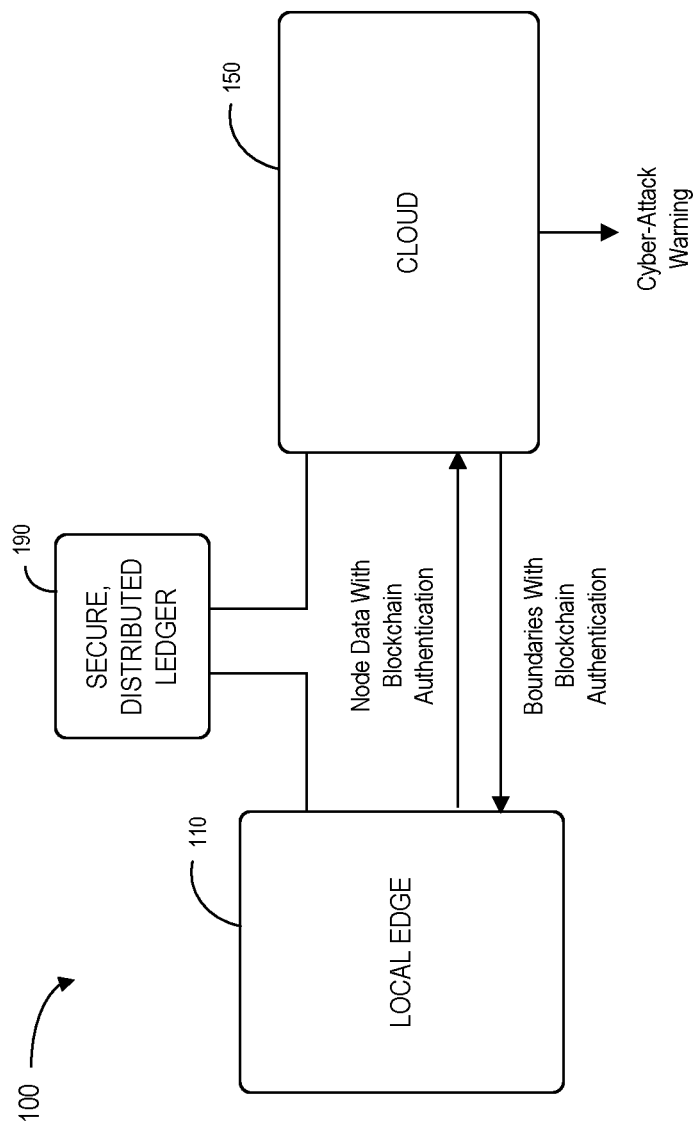
FIG. 1 is a high-level block diagram of a system that may be provided in accordance with some embodiments.

FIG. 1 is a high-level block diagram of a system 100 that may be provided in accordance with some embodiments. The system 100 that includes a local edge 110 (e.g., associated with an industrial asset) that may provide monitoring node data to a cloud-based application 150. The monitoring node data might, for example, include sensor data, actuator data, etc. associated with operation of an industrial asset. The cloud-based application 150 may also transmit one or more decision boundaries to the local edge 110. The decision boundaries may, as described in connection with FIGS. 3 through 14, be associated with a features-base determination of whether operation of the industrial asset is "normal" or "abnormal" (e.g., experiencing a cyber-attack). Note that intentional corruption of either the monitoring node data or the decision boundaries (e.g., by a "man-in-the-middle" cyber-attack) could prevent detection of abnormal operation. To avoid such a result, the exchange of this information may be verified using a secure, distributed ledger 190 (e.g., associated with blockchain technology) as described with respect to FIGS. 15 through 36.

Figure 2:
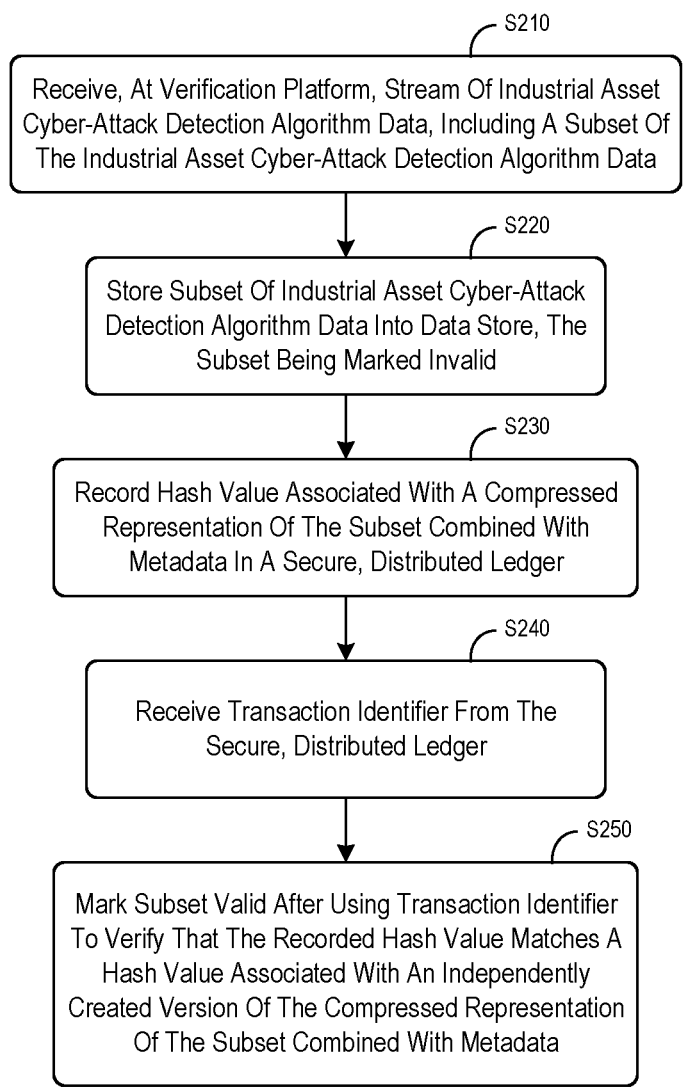
FIG. 2 is a method that may be provided in accordance with some embodiments.

For example, FIG. 2 is a method that may be provided in accordance with some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The method of FIG. 2 may be used to facilitate industrial asset cyber-attack detection algorithm verification for an industrial asset, such as an engine, an aircraft, a locomotive, power generation, a wind turbine, etc. At S210, a computer processor of a verification platform may receive a stream of industrial asset cyber-attack detection algorithm data, including a subset of the industrial asset cyber-attack detection algorithm data. The industrial asset cyber-attack detection algorithm data might include, for example, at least one feature-based classification boundary. Note that the verification platform might be associated with a single network cloud-hosted topology, a multiple network cloud-hosted topology, a participant hosted intranet environment, etc.

At S220, the verification platform may store the subset of industrial asset cyber-attack detection algorithm data into a data store, the subset of industrial asset cyber-attack detection algorithm data being marked as invalid. The verification platform may then record, at S230, a hash value associated with a compressed representation of the subset of industrial asset cyber-attack detection algorithm data combined with metadata in a secure, distributed ledger. According to some embodiments, the compressed representation of the subset of industrial asset cyber-attack detection algorithm data combined with metadata comprises a trie. For example, the compressed representation of the subset of industrial asset cyber-attack detection algorithm data combined with metadata might be implemented using a Patricia-Merkle trie. As used herein, the term "metadata" might refer to, for example, a pseudo identifier, a time stamp, a unique client identifier, data shape information, etc.

At S240, the verification platform may receive a transaction identifier from the secure, distributed ledger. The secure, distributed ledger might be associated with, for example, blockchain technology. At S250, the subset of industrial asset cyber-attack detection algorithm data in the data store may be marked as being valid after using the transaction identifier to verify, at the verification platform, that the recorded hash value matches a hash value associated with an independently created version of the compressed representation of the subset of industrial asset cyber-attack detection algorithm data combined with metadata.

According to some embodiments, the data connection is further to receive a stream of industrial asset data, including a subset of the industrial asset data, from industrial asset sensors (e.g., monitoring nodes). In this case, the verification platform may store the subset of industrial asset data into the data store (the subset of industrial asset data being marked as invalid) and record a hash value associated with a compressed representation of the subset of industrial asset data combined with metadata in the secure, distributed ledger. The verification platform may then receive a transaction identifier from the secure, distributed ledger and mark the subset of industrial asset data in the data store as being valid after using the transaction identifier to verify that the recorded hash value matches a hash value of an independently created version of the compressed representation of the subset of industrial asset data combined with metadata. Moreover, according to some embodiments, the data store is further adapted to provide information marked as being valid to a consuming platform.

Figure 3:
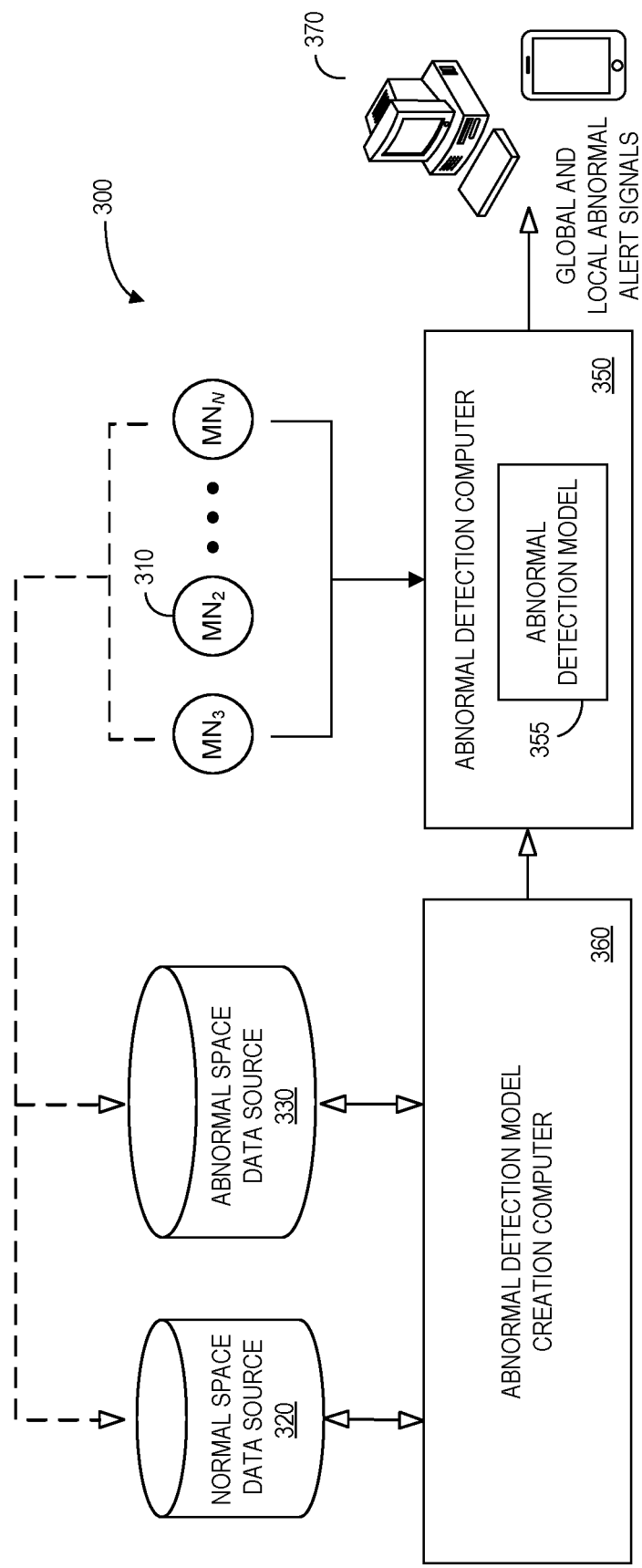
FIG. 3 is a high-level block diagram of a system that may be provided in accordance with some embodiments.

A description of cyber-attack detection using features-based decision boundaries will now be provided in connection with FIGS. 3 through 13. In particular, FIG. 3 is a high-level architecture of a system 300 in accordance with some embodiments. The system 300 may include monitoring node sensors 310 $MN_1$ through $MN_N$, a "normal space" data source 320, and an "abnormal space" data source 330. The normal space data source 320 might store, for each of the plurality of monitoring nodes 310, a series of normal values over time that represent normal operation of a cyber-physical system (e.g., generated by a model or collected from actual sensor data as illustrated by the dashed line in FIG. 3). The abnormal space data source 330 might store, for each of the monitoring nodes 310, a series of abnormal values that represent abnormal operation of the cyber-physical system (e.g., when the system is experiencing a cyber-attack or a fault).

Information from the normal space data source 320 and the abnormal space data source 330 may be provided to an abnormal detection model creation computer 360 that uses this data to create a decision boundary (that is, a boundary that separates normal behavior from threatened behavior). According to some embodiments, the monitoring node data and/or the decision boundary information may be verified using a secure, distributed transaction ledger. The decision boundary may then be used by an abnormal detection computer 350 executing an abnormal detection model 355. The abnormal detection model 355 may, for example, monitor streams of data from the monitoring nodes 310 comprising data from sensor nodes, actuator nodes, and/or any other critical monitoring nodes (e.g., sensor nodes $MN_1$ through $MN_N$) and automatically output global and local abnormal alert signal to one or more remote monitoring devices 370 when appropriate (e.g., for display to an operator or to have the global and local information fused in accordance with any of the embodiments described herein). As used herein, the term "automatically" may refer to, for example, actions that can be performed with little or no human intervention. According to some embodiments, information about detected threats may be transmitted back to a cyber-physical system control system.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The abnormal detection model creation computer 360 may store information into and/or retrieve information from various data stores, such as the normal space data source 320 and/or the abnormal space data source 330. The various data sources may be locally stored or reside remote from the abnormal detection model creation computer 360. Although a single abnormal detection model creation computer 360 is shown in FIG. 3, any number of such devices may be included. Moreover, various devices described herein might be combined according to embodiments of the present invention. For example, in some embodiments, the abnormal detection model creation computer 360 and one or more data sources 320, 330 might comprise a single apparatus. The abnormal detection model creation computer 360 functions may be performed by a constellation of networked apparatuses, in a distributed processing or cloud-based architecture.

A user may access the system 300 via one of the monitoring devices 370 (e.g., a Personal Computer ("PC"), tablet, or smartphone) to view information about and/or manage threat information in accordance with any of the embodiments described herein. In some cases, an interactive graphical display interface may let a user define and/or adjust certain parameters (e.g., abnormal detection trigger levels) and/or provide or receive automatically generated recommendations or results from the abnormal detection model creation computer 360 and/or abnormal detection computer 350.

Thus, some embodiments described herein may use time series data from one or more monitoring nodes 310 from a physical (i.e., industrial or enterprise) asset and provide a reliable abnormality detection with low false positive rate. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. Note that features may be computed at the local level (associated with each monitoring node) and the global level (associated with all the monitoring nodes, i.e., the whole asset). The time-domain values of the nodes or their extracted features may be, according to some embodiments, normalized for better numerical conditioning.

Figure 4:
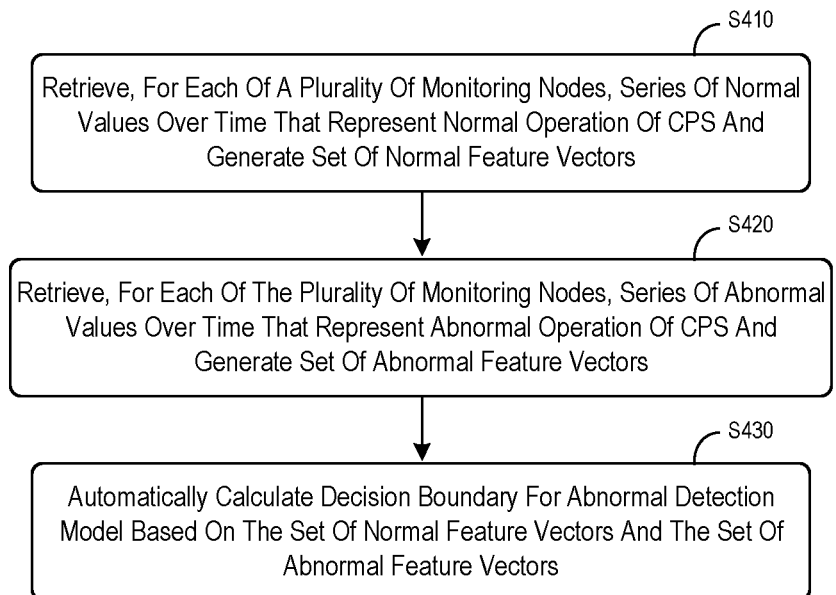
FIG. 4 is a model creation method according to some embodiments.

FIG. 4 illustrates a model creation method that might be performed by some or all of the elements of the system 300 described with respect to FIG. 3. At S410, the system may retrieve, for each of a plurality of monitoring nodes (e.g., sensor nodes, ac, controller nodes, etc.), a series of normal values over time that represent normal operation of the Cyber-Physical System ("CPS") and a set of normal feature vectors may be generated. Similarly, at S420 the system may retrieve, for each of the plurality of monitoring nodes, a series of abnormal (e.g., attacked) values over time that represent an abnormal operation of the cyber-physical system and a set of abnormal feature vectors may be generated. The series of normal and/or abnormal values might be obtained, for example, by running Design of Experiments ("DoE") on a cyber-physical system. At S430, a decision boundary may be automatically calculated for an abnormal detection model based on the set of normal feature vectors and the set of abnormal feature vectors. Note that any of the data exchanged in connection with FIG. 4 might be verified using a secure, distributed transaction ledger. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space, attacked space, and degraded operation space (e.g., when a sensor fault occurs). In addition, note that the abnormal detection model might be associated with the decision boundary, feature mapping functions, and/or feature parameters.

Figure 5:
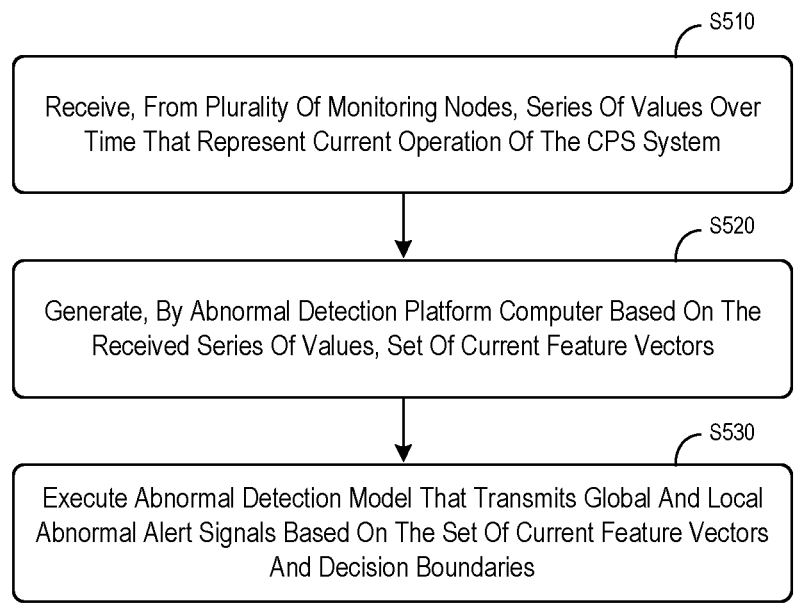
FIG. 5 is an abnormal alert method according to some embodiments.

The decision boundary can then be used to detect abnormal operation (e.g., as might occur during cyber-attacks). For example, FIG. 5 is an abnormal alert method according to some embodiments. At S510, the system may receive, from a plurality of monitoring nodes, a series of current values over time that represent a current operation of the cyber-physical system (and the received data might be verified using a secure, distributed transaction ledger as described with respect to FIGS. 15 through 35). At S520, an attack detection platform computer may then generate, based on the received series of current values, a set of current feature vectors. At S530, an abnormal detection model may be executed to transmit an abnormal alert signal based on the set of current feature vectors and a decision boundary when appropriate (e.g., when a cyber-attack is detected). According to some embodiments, one or more response actions may be performed when an abnormal alert signal is transmitted. For example, the system might automatically shut down all or a portion of the cyber-physical system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitored in substantially real-time. Abnormalities may be detected by classifying the monitored data as being "normal" or disrupted (or degraded). This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines or machine learning techniques) may be used to generate decision boundaries. Since boundaries may be driven by measured data (or data generated from high-fidelity models), defined boundary margins may help to create an abnormal zone in a multi-dimensional feature space. Moreover, the margins may be dynamic in nature and adapted based on a transient or steady state model of the equipment and/or be obtained while operating the system as in self-learning systems from incoming data stream. According to some embodiments, a training method may be used for supervised learning to teach decision boundaries. This type of supervised learning may take into account on operator's knowledge about system operation (e.g., the differences between normal and abnormal operation).

Figure 6:
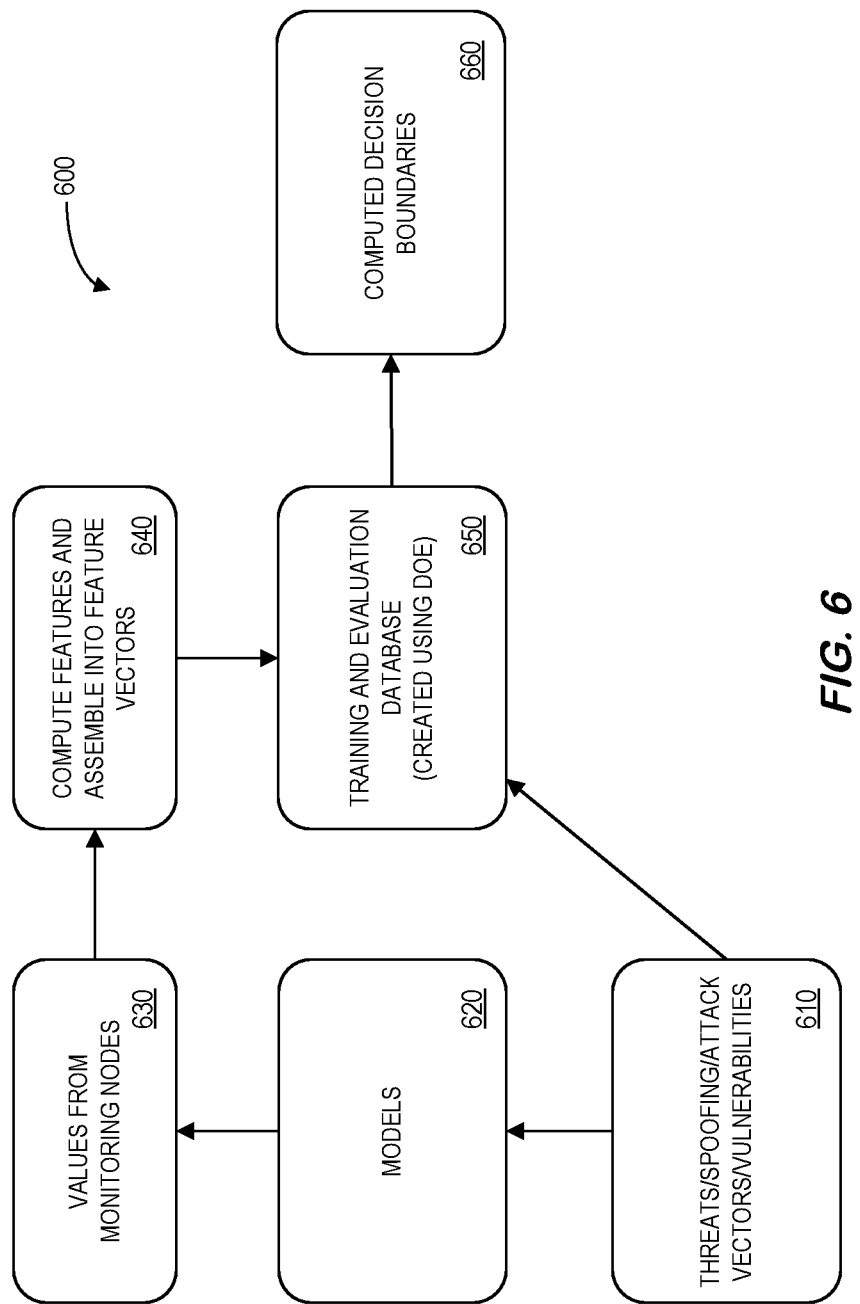
FIG. 6 illustrates an off-line process in accordance with some embodiments.

FIG. 6 illustrates an off-line boundary creation process 600 in accordance with some embodiments. Information about threats, spoofing, attack vectors, vulnerabilities, etc. 610 may be provided to models 620 and/or a training and evaluation database 650 created using DoE techniques. The models 620 may, for example, simulate data 630 from monitoring nodes to be used to compute features that are assembled into a feature vector 640 to be stored in the training and evaluation database 650. The data in the training and evaluation database 650 may then be used to compute decision boundaries 660 to distinguish between normal operation and abnormal operation. According to some embodiments, the process 600 may include a prioritization of monitoring nodes and anticipated attack vectors to form one or more data sets to develop decision boundaries. Attack vectors are abnormal values at critical inputs where malicious attacks can be created at the domain level that will make the system go into threatened/abnormal space. In addition, the models 620 may comprise high-fidelity models that can be used to create a data set (e.g., a set that describes threat space as "levels of threat conditions in the system versus quantities from the monitoring nodes"). The data 630 from the monitoring nodes might be, for example, quantities that are captured for a length of from 60 to 80 seconds from sensor nodes, actuator nodes, and/or controller nodes (and a similar data set may be obtained for "levels of normal operating conditions in the system versus quantities from the monitoring nodes"). This process will result in data sets for "abnormal space" and "normal space." The 60 to 80 seconds long quantities may be used to compute features 640 using feature engineering to create feature vectors. These feature vectors can then be used to obtain a decision boundary that separates the data sets for abnormal space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 7:
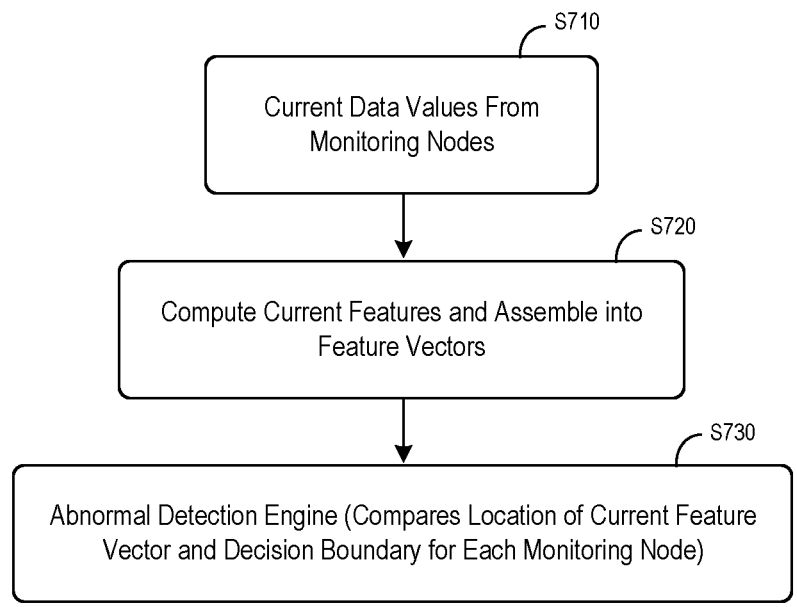
FIG. 7 illustrates a real-time process according to some embodiments.

FIG. 7 illustrates a real-time process to protect a cyber-physical system according to some embodiments. At S710, current data from monitoring nodes may be gathered (e.g., in batches of from 60 to 80 seconds that are verified using a secure, distributed transaction ledger). At S720, the system may compute features and form feature vectors. For example, the system might use weights from a principal component analysis as features. At S730, an abnormal detection engine may compare location of feature vectors to a decision boundary to make a determination (and output an abnormal signal if necessary). According to some embodiments, monitoring node data from models (or from real systems) may be expressed in terms of features since features are a high-level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple monitoring nodes and specific locations). Embodiments may incorporate any number of features, with more features allowing the approach to become more accurate as the system learns more about the physical process and threat. According to some embodiments, dissimilar values from monitoring nodes may be normalized to unit-less space, which may allow for a simple way to compare outputs and strength of outputs.

Figure 8:
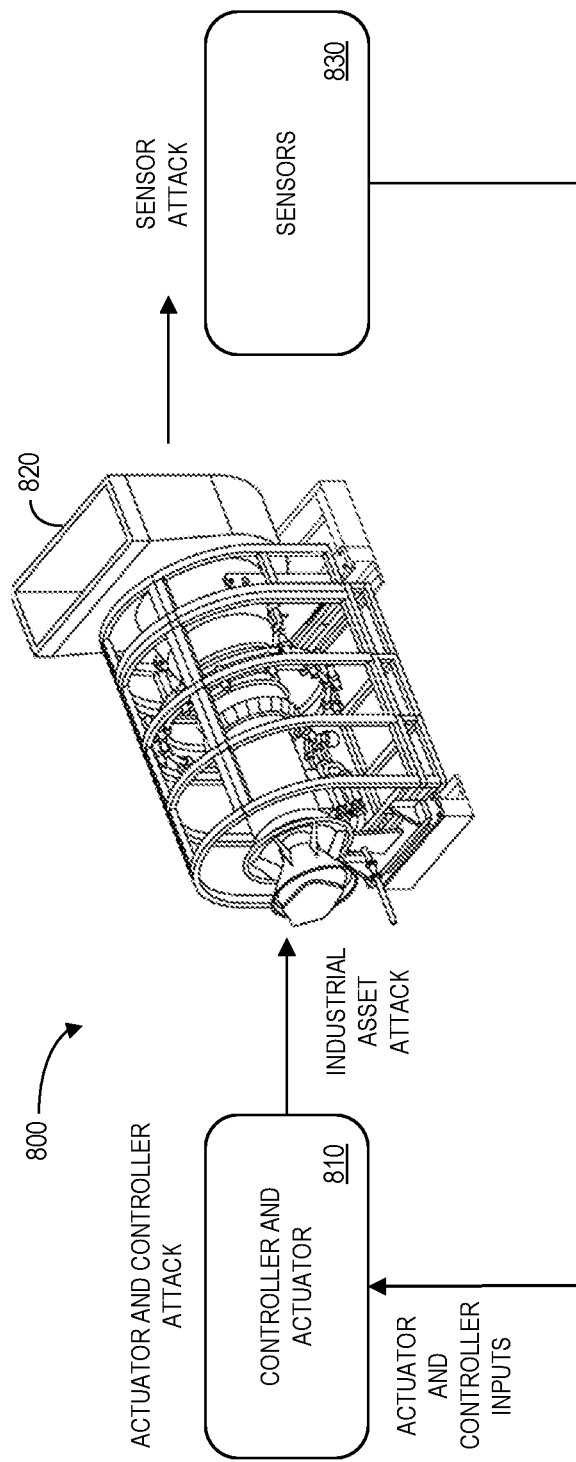
FIG. 8 is an example associated with a cyber-physical system engine in accordance with some embodiments.

FIG. 8 is an example 800 associated with a cyber-physical system in accordance with some embodiments. In particular, the example includes a controller and actuator portion 810 subject to actuator and controller attacks, a gas turbine portion 820 subject to state attacks, and sensors 830 subject to sensor attacks. By way of examples only, the sensors 830 might comprise physical and/or virtual sensors associated with temperatures, airflows, power levels, etc. The actuators might be associated with, for example, motors. By monitoring the information in the cyber-physical system, a threat detection platform may be able to detect cyber-attacks (e.g., using feature vectors and a decision boundary) that could potentially cause a large amount of damage.

Figure 9:
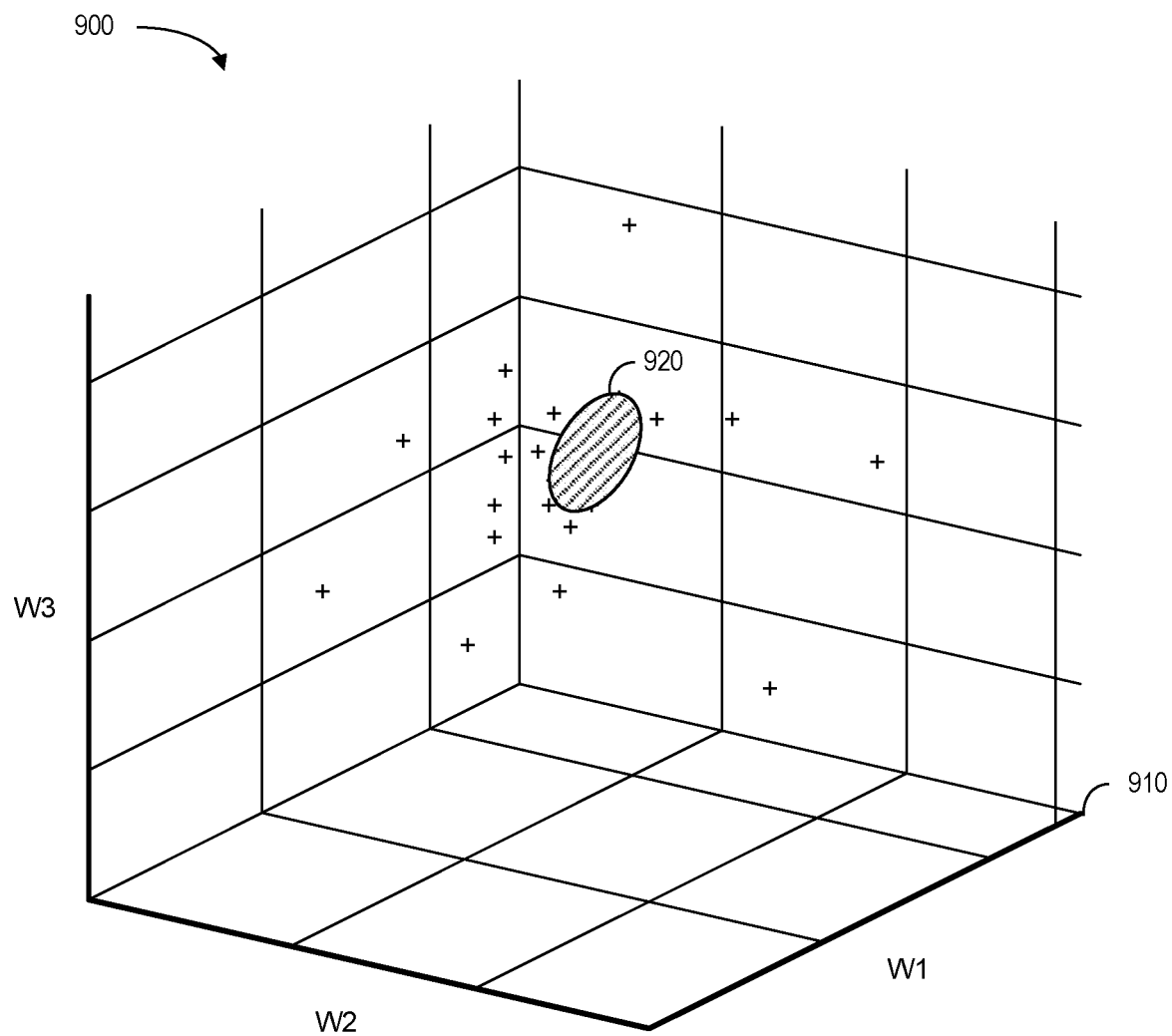
FIG. 9 illustrates three dimensions of sensor outputs in accordance with some embodiments.
Figure 10:
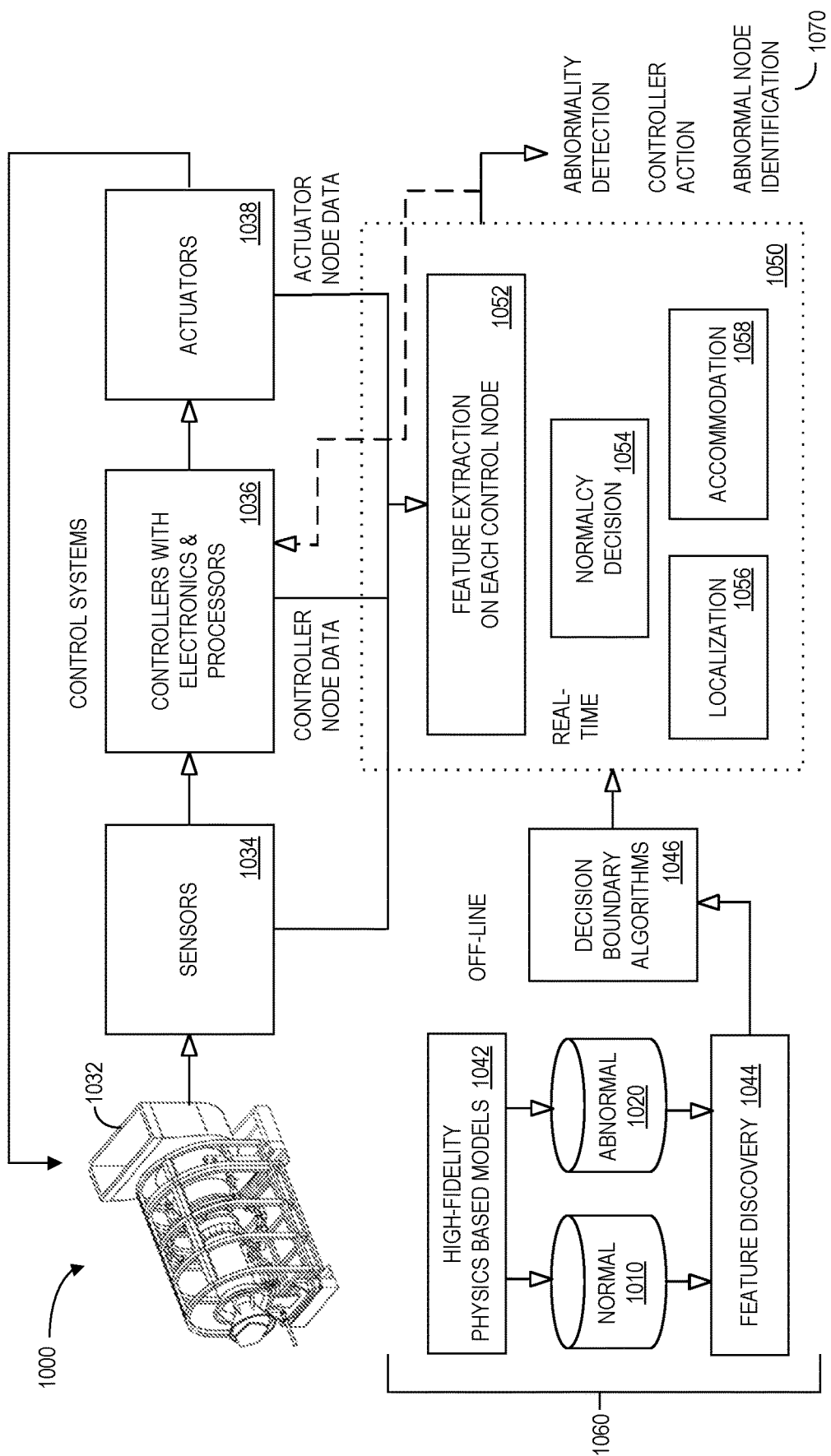
FIG. 10 is an abnormal alert system according to some embodiments.

FIG. 9 illustrates 900 three dimensions of monitoring node outputs in accordance with some embodiments. In particular, a graph 910 plots monitoring node outputs ("+") in three dimensions, such as dimensions associated with Principal Component Features ("PCF"): w1, w2, and w3. Moreover, the graph 910 includes an indication of a normal operating space decision boundary 920 that may be verified using a secure, distributed transaction ledger. Although a single contiguous boundary 920 is illustrated in FIG. 9, embodiments might be associated with multiple regions. Note that PCF information may be represented as weights in reduced dimensions. For example, data from each monitoring node may be converted to low dimensional features (e.g., weights). According to some embodiments, monitoring node data is normalized as follows:

$$S_{normalized}(k) = \frac{S_{nominal}(k) - S_{original}(k)}{\overline{S}_{nominal}}$$

where S stands for a monitoring node quantity at "k" instant of time. Moreover, output may then be expressed as a weighted linear combination of basis functions as follows:

$$S = S_0 + \sum_{j=1}^{N} w_i \Psi_j$$

where $S_0$ is the average monitoring node output with all threats, $w_j$ is the $j^{th}$ weight, and $\Psi_j$ is the $j^{th}$ basis vector. According to some embodiments, natural basis vectors are obtained using a covariance of the monitoring nodes' data matrix. Once the basis vectors are known, weight may be found using the following equation (assuming that the basis sets are orthogonal):

$$w_j = (S - S_0)^T \Psi_j$$

Note that weights may be an example of features used in a feature vector.

Thus, embodiments may enable the passive detection of indications of multi-class abnormal operations using real-time signals from monitoring nodes. Moreover, the detection framework may allow for the development of tools that facilitate proliferation of the invention to various systems (e.g., turbines) in multiple geolocations. According to some embodiments, distributed detection systems enabled by this technology (across multiple types of equipment and systems) will allow for the collection of coordinated data to help detect multi-prong attacks. Note that the feature-based approaches described herein may allow for extended feature vectors and/or incorporate new features into existing vectors as new learnings and alternate sources of data become available. As a result, embodiments may detect a relatively wide range of cyber-threats (e.g., stealth, replay, covert, injection attacks, etc.) as the systems learn more about their characteristics. Embodiments may also reduce false positive rates as systems incorporate useful key new features and remove ones that are redundant or less important. Note that the detection systems described herein may provide early warning to cyber-physical system operators so that an attack may be thwarted (or the effects of the attack may be blunted), reducing damage to equipment.

According to some embodiments, a system may further localize an origin of a threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in a threat alert signal.

Some embodiments of the algorithm may utilize feature-based learning techniques based on high-fidelity physics models and/or machine operation data (which would allow the algorithm to be deployed on any system) to establish a high dimensional decision boundary. As a result, detection may occur with more precision using multiple signals, making the detection more accurate with less false positives. Moreover, embodiments may detect multiple attacks on control signals, and rationalize where the root cause attack originated. For example, the algorithm may decide if a signal is anomalous because of a previous signal attack, or if it is instead independently under attack. This may be accomplished, for example, by monitoring the evolution of the features as well as by accounting for time delays between attacks.

A cyber-attack detection and localization algorithm may process a real-time cyber-physical system signal data stream and then compute features (multiple identifiers) which can then be compared to the signal-specific decision boundary. A block diagram of a system 1000 utilizing a signal-specific cyber-physical system abnormality detection and localization algorithm according to some embodiments is provided in FIG. 10. In particular, a gas turbine 1032 provides information to sensors 1034 which helps controllers with electronics and processors 1036 adjust actuators 1038. A threat detection system 1060 may include one or more high-fidelity physics-based models 1042 associated with the turbine 1032 to create normal data 1010 and/or abnormal data 1020. The normal data 1010 and abnormal data 1020 may be accessed by a feature discovery component 1044 and processed by decision boundary algorithms 1046 while off-line (e.g., not necessarily while the gas turbine 1032 is operating). The decision boundary algorithms 1046 may generate an abnormal model including decision boundaries for various monitoring nodes that may be verified using a secure, distributed transaction ledger. Each decision boundary may separate two data sets in a high dimensional space which is constructed by running a binary classification algorithm, such as a support vector machine using the normal data 1010 and abnormal data 1020 for each monitoring node signal (e.g., from the sensors 1034, controllers 1036, and/or the actuators 1038).

A real-time threat detection platform 1050 may receive the boundaries along with streams of data from the monitoring nodes. The platform 1050 may include a feature extraction on each monitoring node element 1052 and a normalcy decision 1054 with an algorithm to detect attacks in individual signals using signal specific decision boundaries, as well rationalize attacks on multiple signals, to declare which signals were attacked (or are otherwise abnormal), and which became anomalous due to a previous attack on the system via a localization module 1056. An accommodation element 1058 may generate outputs 1070, such as an anomaly decision indication (e.g., an abnormal) alert signal), a controller action, and/or a list of abnormal monitoring nodes.

During real-time detection, contiguous batches of control signal data may be processed by the platform 1050 (after being verified via a secure, distributed transaction ledger), normalized, and the feature vector extracted. The location of the vector for each signal in high-dimensional feature space may then be compared to a verified corresponding decision boundary. If it falls within the abnormal region, then a cyber-attack may be declared. The algorithm may then make a decision about where the attack originally occurred. An attack may sometimes be on the actuators 1038 and then manifested in the sensor 1034 data. Attack assessments might be performed in a post decision module (e.g., the localization element 1056) to isolate whether the attack is related to the sensor, controller, or actuator (e.g., indicating which part of the monitoring node). This may be done by individually monitoring, overtime, the location of the feature vector with respect to the hard decision boundary. For example, when a sensor 1034 is spoofed, the attacked sensor feature vector will cross the hard decision boundary earlier than the rest of the vectors as described with respect to FIGS. 11 through 13. If a sensor 1034 is declared to be anomalous, and a command to the auxiliary equipment is later determined to be anomalous, it may be determined that the original attack, such as signal spoofing, occurred on the sensor 1034. Conversely, if the signal to the auxiliary equipment was determined to be anomalous first, and then later manifested in the sensor 1034 feedback signal, it may be determined that the signal to the equipment was initially attacked.

According to some embodiments, it may be detected whether or not a signal is in the normal operating space (or abnormal space) through the use of localized decision boundaries and real-time computation of the specific signal features. Moreover, an algorithm may differentiate between a sensor being attacked as compared to a signal to auxiliary equipment being attacked. The control intermediary parameters and control logical(s) may also be analyzed using similar methods. Note that an algorithm may rationalize signals that become anomalous. An attack on a signal may then be identified.

Figure 11:
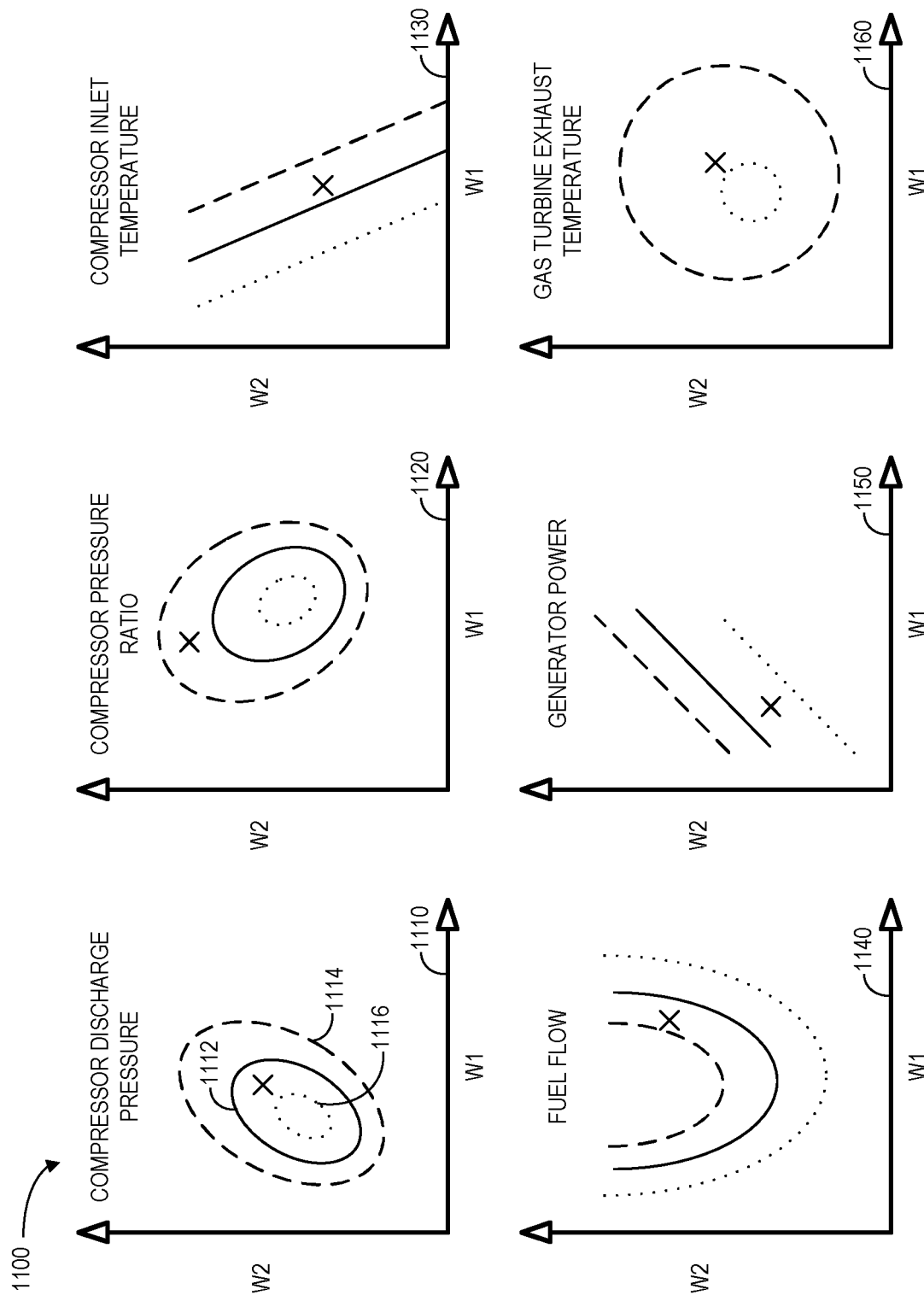
FIGS. 11 through 13 illustrate boundaries and locations of feature vectors for various parameters in accordance with some embodiments.

FIG. 11 illustrates 1100 boundaries and feature vectors for various monitoring node parameters in accordance with some embodiments. In particular, for each parameter a graph includes a first axis representing value weight 1 ("w1"), a feature 1, and a second axis representing value weight 4 ("w2"), a feature 4. Values for w1 and w2 might be associated with, for example, outputs from a Principal Component Analysis ("PCA") that is performed on the input data. PCA might be one of the features that might be used by the algorithm to characterize the data, but note that other features could be leveraged.

A graph is provided for compressor discharge temperature 1110, compressor pressure ratio 1120, compressor inlet temperature 1130, fuel flow 1140, generator power 1150, and gas turbine exhaust temperature 1160. Each graph includes a hard boundary 1112 (solid curve), inner boundary 1116 (dotted curve), and outer boundary 1114 (dashed curve) and an indication associated with current feature location for each monitoring node parameter (illustrated with an "X" on the graphs). As illustrated in FIG. 11, the current monitoring node location is between the minimum and maximum boundaries (that is, the "X" is between the dotted and dashed lines). As a result, the system may determine that the operation of the cyber-physical system control system is normal (and no threat is being detected indicating that the system is currently under attack or that a naturally occurring fault has occurred).

Figure 12:
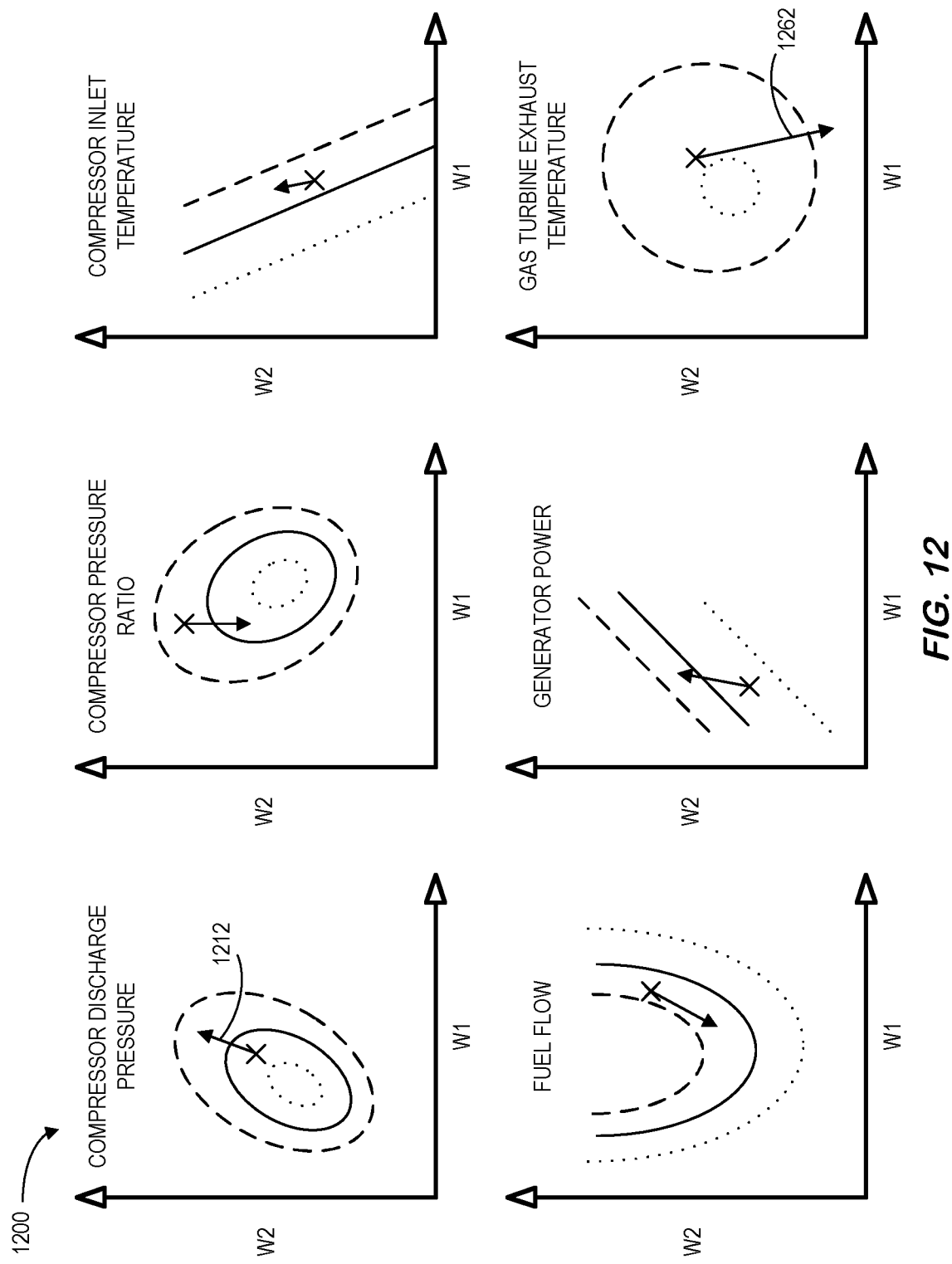

FIG. 12 illustrates 1200 subsequent boundaries and feature vectors for these parameters. Consider, for example, a feature vector movement 1212 for the compressor discharge pressure. Even though feature vector 1212 has moved, it is still within the maximum and minimum boundaries and, as a result, normal operation of that monitoring node may be determined. This is the case for the first five graphs in FIG. 12. In this example, a feature vector movement 1262 for the gas turbine exhaust temperature has exceeded with maximum boundary and, as a result, abnormal operation of that monitoring node may be determined. For example, a threat may exist for the exhaust temperature scale factor, which is a corrective value. The result is that the feature for the intermediary monitoring node signal feature vector illustrated in FIG. 12 moves 1262 such that it is anomalous. The algorithm detects this cyber-attack, and two parallel actions might be initiated. One action may be post processing of the signal to discover what was attacked, in this case if the system has been monitoring each exhaust thermocouple, it may conclude that none of them are currently abnormal. Therefore, it may be determined that something used to calculate this feature was attacked. The other action may be to continually monitor and detect additional attacks. Such an approach may facilitate a detection of multiple signal attacks.

Given the example of FIG. 12, assume that the gas turbine exhaust temperature signal was attacked. This may cause the system to respond in such a way so as to put other signals into an abnormal state. This is illustrated 1300 in FIG. 13, where the attack has already been detected and now other signals shown to be abnormal. In particular, feature movement for the compressor discharge pressure 1312, compressor pressure ratio 1322, compressor inlet temperature 1332, and fuel flow 1342 have all become abnormal (joining the feature vector for the gas turbine exhaust temperature 1362). Note that the feature vector for generator power did not become abnormal. In order to decide whether or not these signals 1312, 1322, 1332, 1342 are truly currently under attack, a historical batch with pertinent feature vector information may be kept for some duration of time. Then when an attack is detected on another signal, this batch is examined, and the time at which the confirmed attack on gas turbine exhaust temperature as well as several subsequent elements is analyzed.

Note that one signal rationalization might be associated with a system time delay. That is, after a sensor is attacked there might be a period of time before the system returns to a steady state. After this delay, any signal that becomes anomalous might be due to an attack as opposed to the system responding.

The current methods for detecting abnormal conditions in monitoring nodes are limited to Fault Detection Isolation and Accommodation ("FDIA"), which itself is very limited. The cyber-attack detection and localization algorithms described herein can not only detect abnormal signals of sensors, but can also detect signals sent to auxiliary equipment, control intermediary parameters and/or control logical(s). The algorithm can also understand multiple signal attacks. One challenge with correctly identifying a cyber-attack threat is that it may occur with multiple sensors being impacted by malware. According to some embodiments, an algorithm may identify in real-time that an attack has occurred, which sensor(s) are impacted, and declare a fault response. To achieve such a result, the detailed physical response of the system must be known to create acceptable decision boundaries. This might be accomplished, for example, by constructing data sets for normal and abnormal regions by running DoE experiments on high-fidelity models. A data set for each sensor might comprise a feature vector for given threat values (e.g., temperature, airflow, etc.). Full factorial, Taguchi screening, central composite and Box-Behnken are some of the known design methodologies used to create the attack space. When models are not available, these DoE methods are also used to collect data from real-world cyber-physical systems. Experiments may be run at different combinations of simultaneous attacks. In some embodiments, the system may detect degraded/faulty operation as opposed to a cyber-attack. Such decisions might utilize a data set associated with a degraded/faulty operating space. At the end of this process, the system may create data sets such as "attack v/s normal" and "degraded v/s normal" for use while constructing decision boundaries. Further note that a decision boundary may be created for each signal using data sets in feature space. Various classification methods may be used to compute decision boundaries. For example, binary linear and non-linear supervised classifiers are examples of methods that could be used to obtain a decision boundary.

Figure 13:
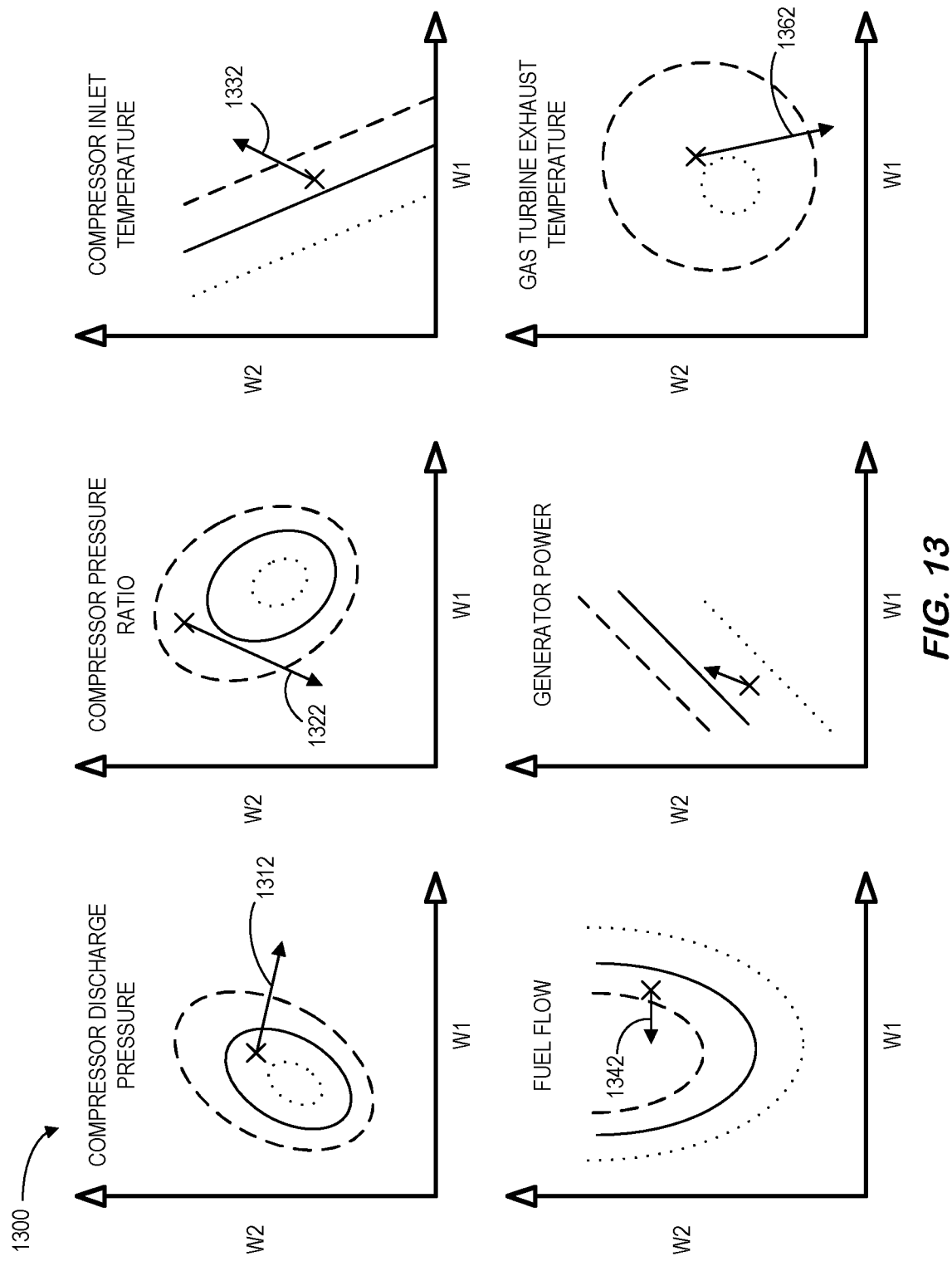

Note that multiple vector properties might be examined, and the information described with respect to FIGS. 11 through 13 may be processed to determine if the signal had been trending in a specific direction as the attack was detected (or if it had just been moving due to noise). Had the signal been uniformly trending as the attack took place and afterward, then this signal is a response to the original attack and not an independent attack.

According to some embodiments, the system may localize or otherwise analyze an origin of the threat to a particular monitoring node. For example, the localizing may be performed in accordance with a time at which a decision boundary associated with one monitoring node was crossed as compared to a time at which a decision boundary associated with another monitoring node was crossed. According to some embodiments, an indication of the particular monitoring node might be included in the threat alert signal.

Some embodiments described herein may take advantage of the physics of a cyber-physical system by learning a priori from tuned high-fidelity equipment models and/or actual "on the job" data to detect single or multiple simultaneous adversarial threats to the system. Moreover, according to some embodiments, all monitoring node data may be converted to features using advanced feature-based methods, and the real-time operation of the cyber-physical system may be monitored in substantially real-time. Abnormalities may be detected by classifying the monitored data as being "normal" or disrupted (or degraded). This decision boundary may be constructed using dynamic models and may help to enable early detection of vulnerabilities (and potentially avert catastrophic failures) allowing an operator to restore the cyber-physical system to normal operation in a timely fashion.

Thus, some embodiments may provide an advanced anomaly detection algorithm to detect cyber-attacks on, for example, key cyber-physical system control sensors. The algorithm may identify which signals(s) are being attacked using control signal-specific decision boundaries and may inform a cyber-physical system to take accommodative actions. In particular, a detection and localization algorithm might detect whether a sensor, auxiliary equipment input signal, control intermediary parameter, or control logical are in a normal or anomalous state. Some examples of cyber-physical system monitoring nodes that might be analyzed include: critical control sensors; control system intermediary parameters; auxiliary equipment input signals; and/or logical commands to controller.

A cyber-attack detection and localization algorithm may process a real-time cyber-physical system signal data stream and then compute features (multiple identifiers) which can then be compared to the sensor specific decision boundary. In some embodiments, generating features may involve simply performing an identity transform. That is, the original signal might be used as it is.

Figure 14:
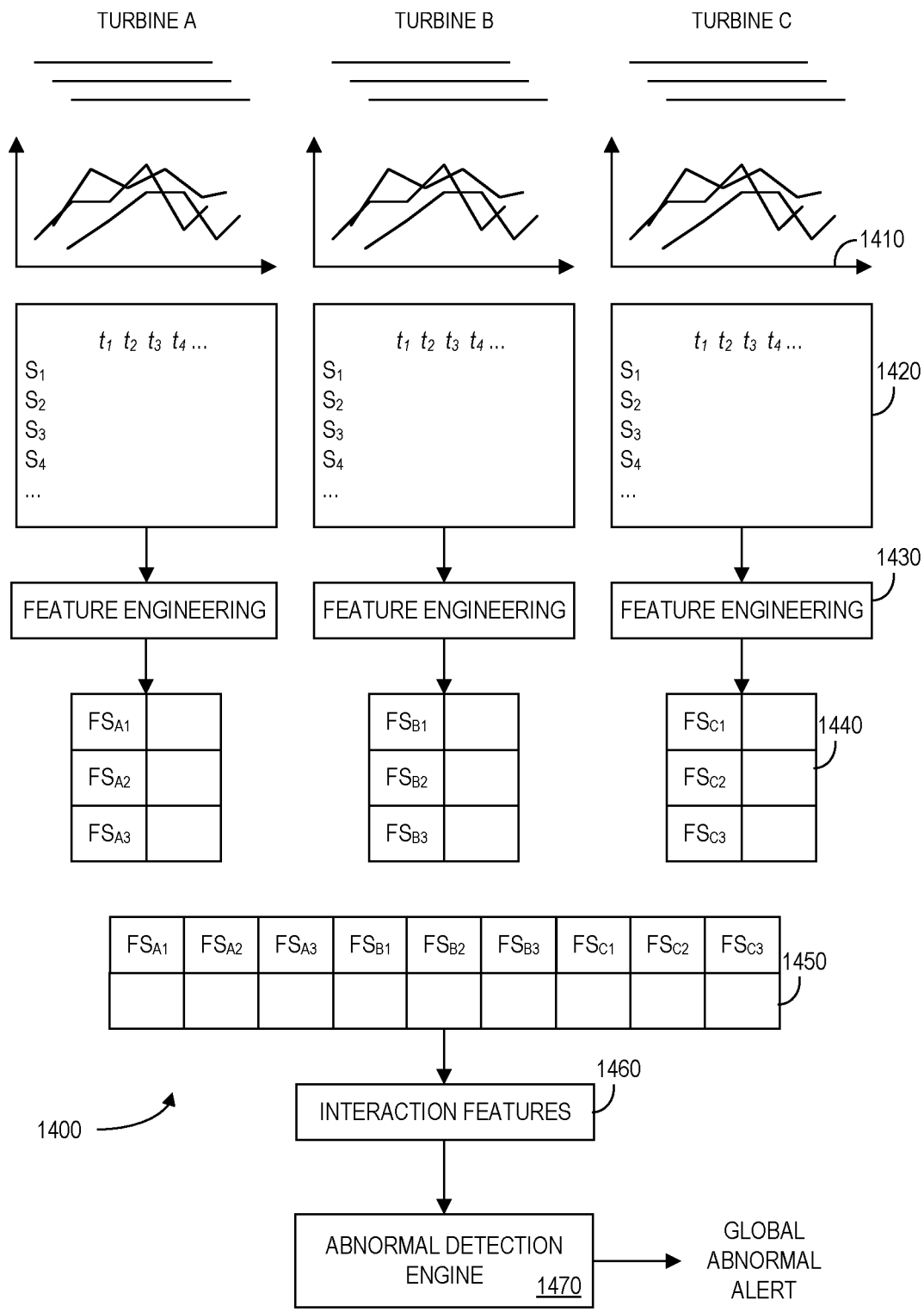
FIG. 14 is an example of a global abnormality protection system in accordance with some embodiments when multiple gas turbines are involved in a system.

Feature vectors may be generated on a monitoring-node-by-monitoring node basis and may be considered "local" to each particular monitoring node. FIG. 14 is an example of a "global" abnormality protection system 1400 in accordance with some embodiments when multiple gas turbines are involved in a system. In particular, the system 1400 includes three turbines (A, B, and C) and batches of values 1410 from monitoring nodes are collected for each generated over a period of time (e.g., 60 to 80 seconds). According to some embodiments, the batches of values 1410 from monitoring nodes overlap in time. The values 1410 from monitoring nodes may, for example, be stored in a matrix 1420 arranged by time ($t_1$, $t_2$, etc.) and by type of monitoring node ($S_1$, $S_5$, etc.). Feature engineering components 1430 may use information in each matrix 1420 to create a feature vector 1440 for each of the three turbines (e.g., the feature vector 1440 for turbine C might include $FS_{C1}$, $FS_{C2}$, etc.). The three feature vectors 1440 may then be combined into a single global feature vector 1450 for the system 1400. Interaction features 1460 may be applied (e.g., associated with A*B*C, A+B+C, etc.) and an anomaly detection engine 1470 may compare the result with a decision boundary (verified via a secure, distributed transaction ledger) and output a global abnormal alert signal when appropriate.

Thus, a system may generate both local normal/abnormal decisions (for each monitoring node) and a global normal/abnormal decision (for the entire cyber-physical system). These decisions, however, rely on the monitoring node and/or decision boundary data exchange between devices. As a result, a "man-in-the-middle" attack may comprise industrial asset cyber-attack protection. It may therefore be generally desirable to efficiently and accurately facilitate industrial asset cyber-attack detection algorithm verification.

Figure 15:
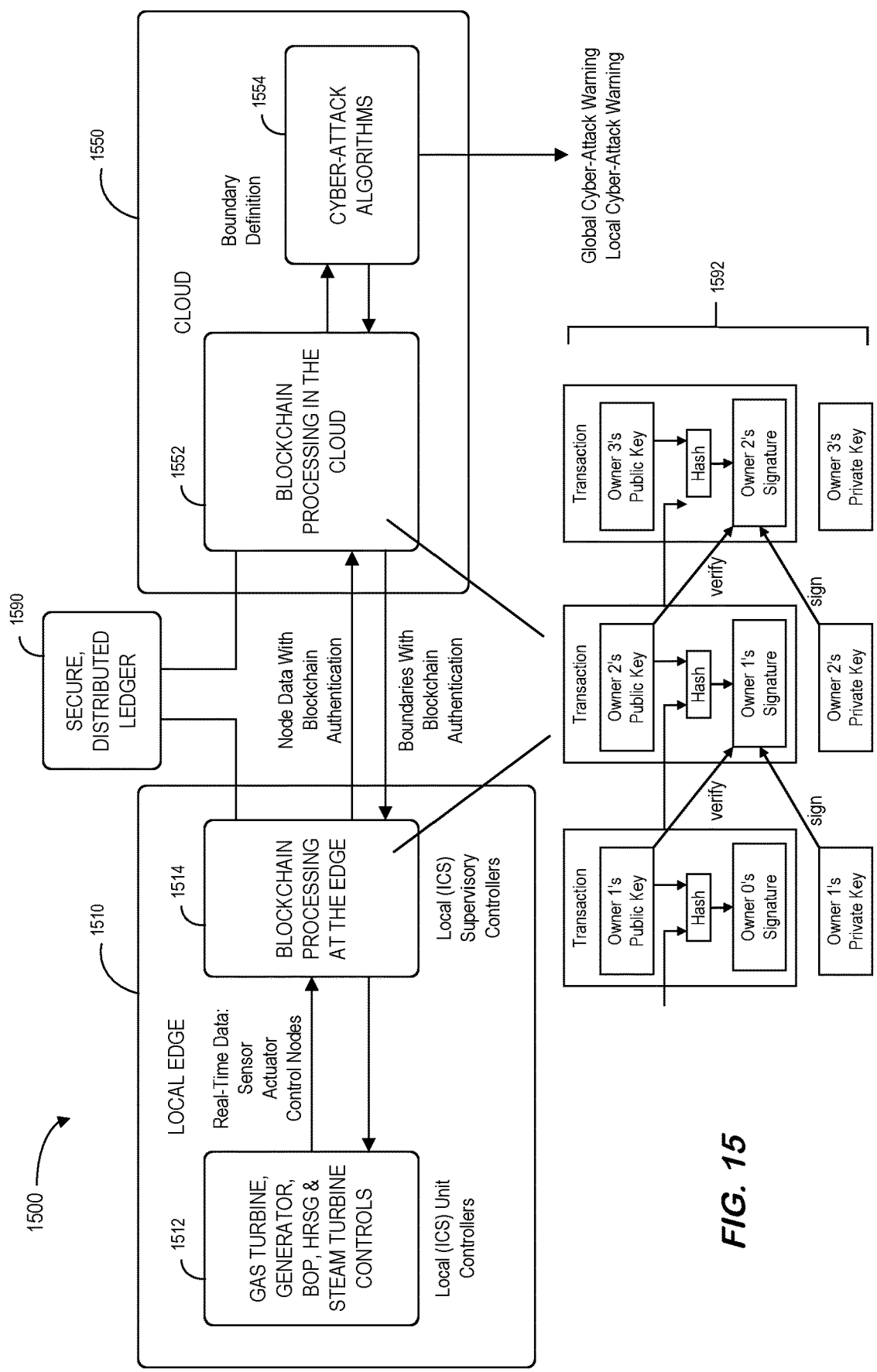
FIG. 15 is a more detailed view of the system of FIG. 1 in accordance with some embodiments

FIG. 15 is a more detailed view 1500 of the system 100 described with respect to FIG. 1 in accordance with some embodiments. The system 1500 includes local edge devices 1510 including local Industrial Control System ("ICS") unit controllers 1512 for a gas turbine, generator, Balance of Plant ("BOP"), Heat Recover Steam Generator ("HRSG"), steam turbine controls, etc. The local edge devices 1512 exchanges information with local ICS supervisory controllers 1514 which may incorporate blockchain processing at the edge. For example, the local ICS unit controllers 1512 might transmit real-time data (from sensor actuator control nodes) to the local ICS supervisory controllers 1514.

The local ICS supervisory controllers 1514 may transmit node data with blockchain authentication to blockchain processing 1552 in the cloud 1550. In addition, cyber-attack algorithms 1554 may transmit boundary definition data to the blockchain processing in the cloud 1552 which, in turn, may send the boundaries to the local ICS supervisory controllers 1514. Note that raw, unencrypted data transmitted from an ICS to the cloud-based cyber-attack detection algorithms 1554 has the potential of being modified, spoofed, revised, tampered or attacked. The raw node data may originate from data reported by a local processing unit or a remote unit located in the field away from the local processing unit. Any data transmitted over a digital communication system has the potential of being corrupted. Additionally, raw unencrypted detection boundary data and signatures transmitted from the cloud infrastructure 1550 to a ICS may be altered in a malicious manor. There may therefore be a need to protect the integrity of this bidirectional data.

To prevent "man-in-the-middle" cyber-attacks, data exchanged between the local edge 1510 and the cloud 1550 may be protected via a secure, distributed ledger 1590. In this way, blockchain technology may encrypt node data and boundary data for the cyber-attack detection algorithms 1554. The blockchain technology may serve as a public ledger for all transactions between the cloud 1550 and local edge system 1510. The cloud 1550 and local edge 1510 may connect to a network, send new transactions, verify transactions, and act to create new blocks. A transaction may be associated with raw data, normalization data, feature selection, boundary selection, global signatures, etc.

According to some embodiments, blockchain technology is used create a digital certificate which can be verified for authenticity. Blockchains are made up of blocks that contain batches of valid transactions 1592. Each new block may be linked to a prior block in the chain by "hash" technology (linking the transactions into a chain) to provide a secure method of data transfer. For example, a public key may be used for a transaction 1592 to define a user's unique address on the block chain. The public key may be, according to some embodiments, a randomly generated string of numbers. The private key (e.g., a user's password) may give the local edge 1510 or cloud 1550 access to the digital data. Moreover, storing the time stamped data on the blockchain may provide a system that is resistant to corruption. In addition to these features, the secure, distributed ledger 1590 may be implemented to store the history of the block chain. The data may also be stored in several locations on the network to reduce the risk of storing the data centrally.

Figure 16:
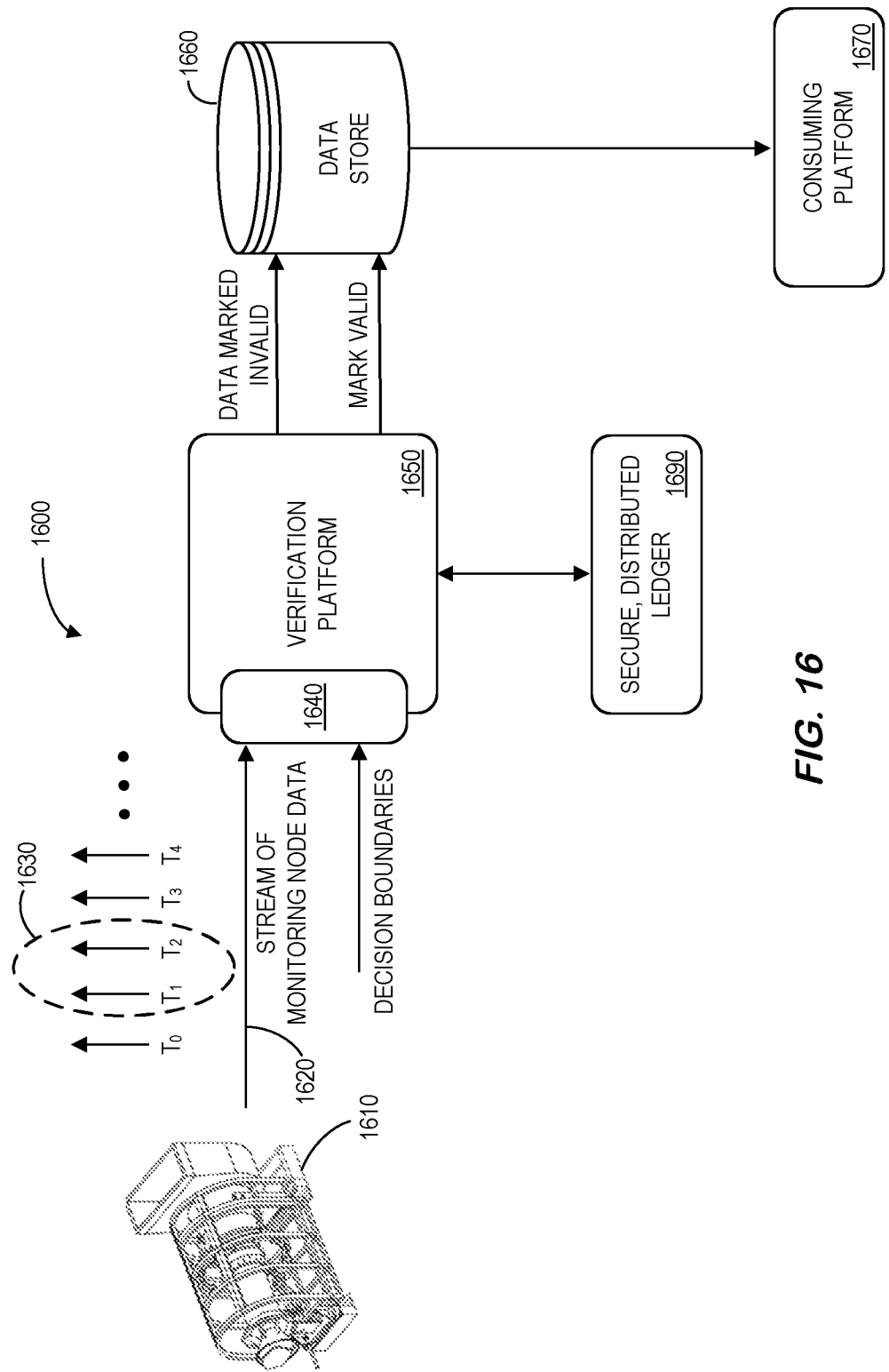
FIG. 16 is a high-level block diagram of a system according to some embodiments.

The secure, distributed ledger 1590 might be utilized in a number of different ways. One approach will now be described in connection with FIGS. 16 through 36. In particular, FIG. 16 is a high-level block diagram of a system 1600 according to some embodiments. The system 1600 includes a verification platform 1650 with a communication port 1640 to receive a stream of industrial asset cyber-attack detection algorithm data 1620 from sensors and other components of an industrial asset 1610 (including values T0, T1, T2, etc.) and/or decision boundary information. The verification platform 1650 might receive a subset 1630 of the stream of data 1620 and store information into a data store 1660 marked as "invalid." The verification platform 1650 might then utilize a secure, distributed ledger 1690 to verify the information and then mark the stored data as "valid" so that it can be safely used by a consuming platform 1670. A similar approach may be used by the verification platform 1650 to secure the decision boundary information.

According to some embodiments, the data store 1660 stores electronic records defining the received stream of industrial data 1620 and/or decision boundaries. According to some embodiments, the verification platform 1650 and/or other elements of the system 1600 may then record information about various transactions using the secure, distributed ledger 1690 (e.g., via a blockchain verification process). For example, the verification platform 1650 might record a date and time, hash value, etc. via the secure, distributed ledger 1690 in accordance with any of the embodiments described herein. According to some embodiments, the distributed ledger might be associated with the HYPERLEDGER® blockchain verification system. Note that the verification platform 1650 could be completely de-centralized and/or might be associated with a third party, such as a vendor that performs a service for an enterprise.

The verification platform 1650 might be, for example, associated with a PC, laptop computer, a tablet computer, a smartphone, an enterprise server, a server farm, and/or a database or similar storage devices. According to some embodiments, an "automated" verification platform 1650 may automatically verify industrial data. As used herein, the term "automated" may refer to, for example, actions that can be performed with little (or no) intervention by a human.

As used herein, devices, including those associated with the verification platform 1650 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet. Note that any devices described herein may communicate via one or more such communication networks.

The verification platform 1650 may store information into and/or retrieve information from data stores. The data stores might, for example, store electronic records representing industrial asset sensor data, operational data, etc. The data stores may be locally stored or reside remote from the verification platform 1650. Although a single verification platform 1650 is shown in FIG. 16, any number of such devices may be included. Moreover, various devices described herein might be combined according to embodiments of the present invention. In some embodiments, the verification platform 1650, data store 1660, and/or other devices might be co-located and/or may comprise a single apparatus. For example, the verification platform 1650 might be associated with a single network cloud-hosted topology, a multiple network cloud-hosted topology, a participant hosted intranet environment, etc.

Figure 17:
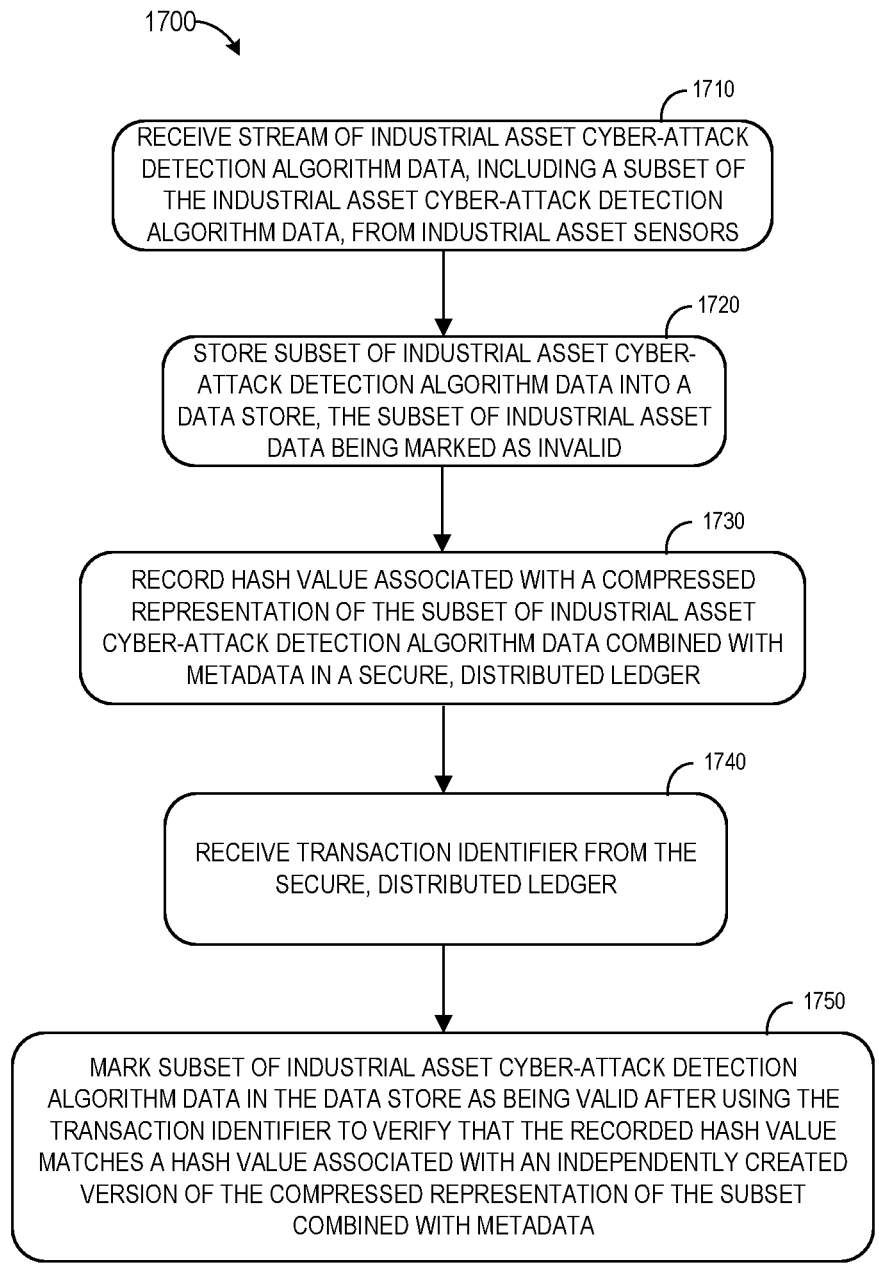
FIG. 17 is a method of verifying industrial data in accordance with some embodiments.

In this way, the system 1600 may efficiently and accurately facilitate industrial asset cyber-attack detection algorithm verification. For example, FIG. 17 is a method 1700 of encoding a signature identifier into an item in accordance with some embodiments. At 1710, a computer processor of a verification platform may receive a stream of industrial asset cyber-attack detection algorithm data, including a subset of the industrial asset cyber-attack detection algorithm data (e.g., a "packet" of data representing monitoring node or decision boundary information), from industrial asset sensors or a decision boundary creation platform. Note that the industrial asset item might be associated with, by way of examples only, an engine, an aircraft, a locomotive, power generation, a wind turbine, etc. At 1720, the verification platform may store the subset of industrial asset cyber-attack detection algorithm data into a data store, the subset of industrial asset cyber-attack detection algorithm data being marked as invalid.

Figure 18:
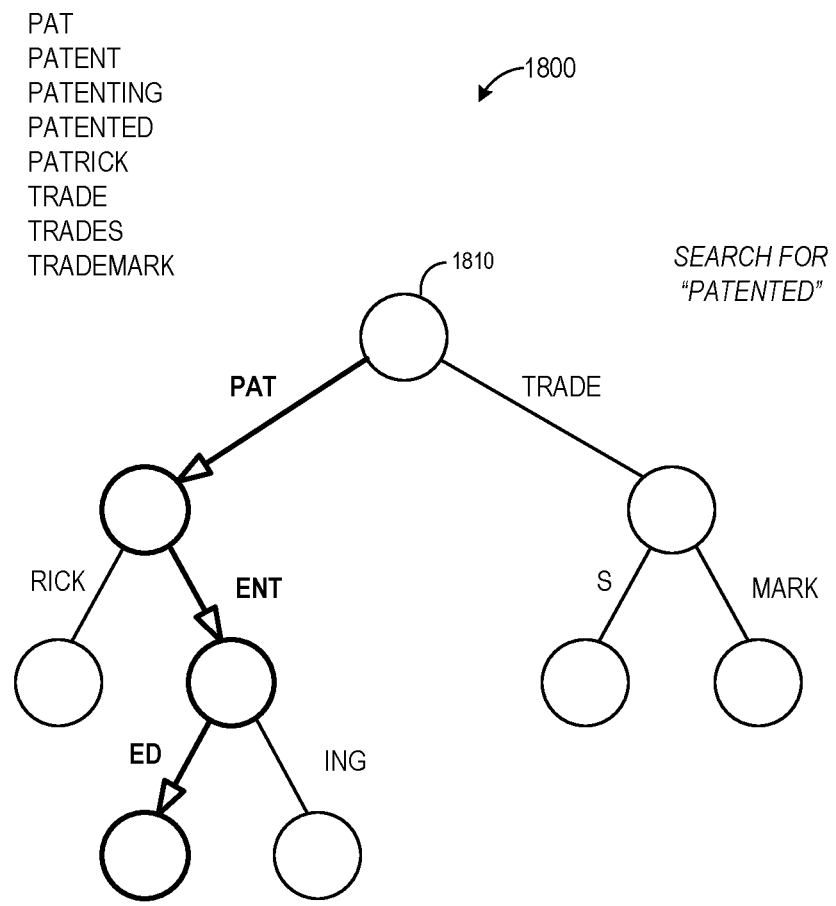
FIG. 18 is an example of trie according to some embodiments.
Figure 19:
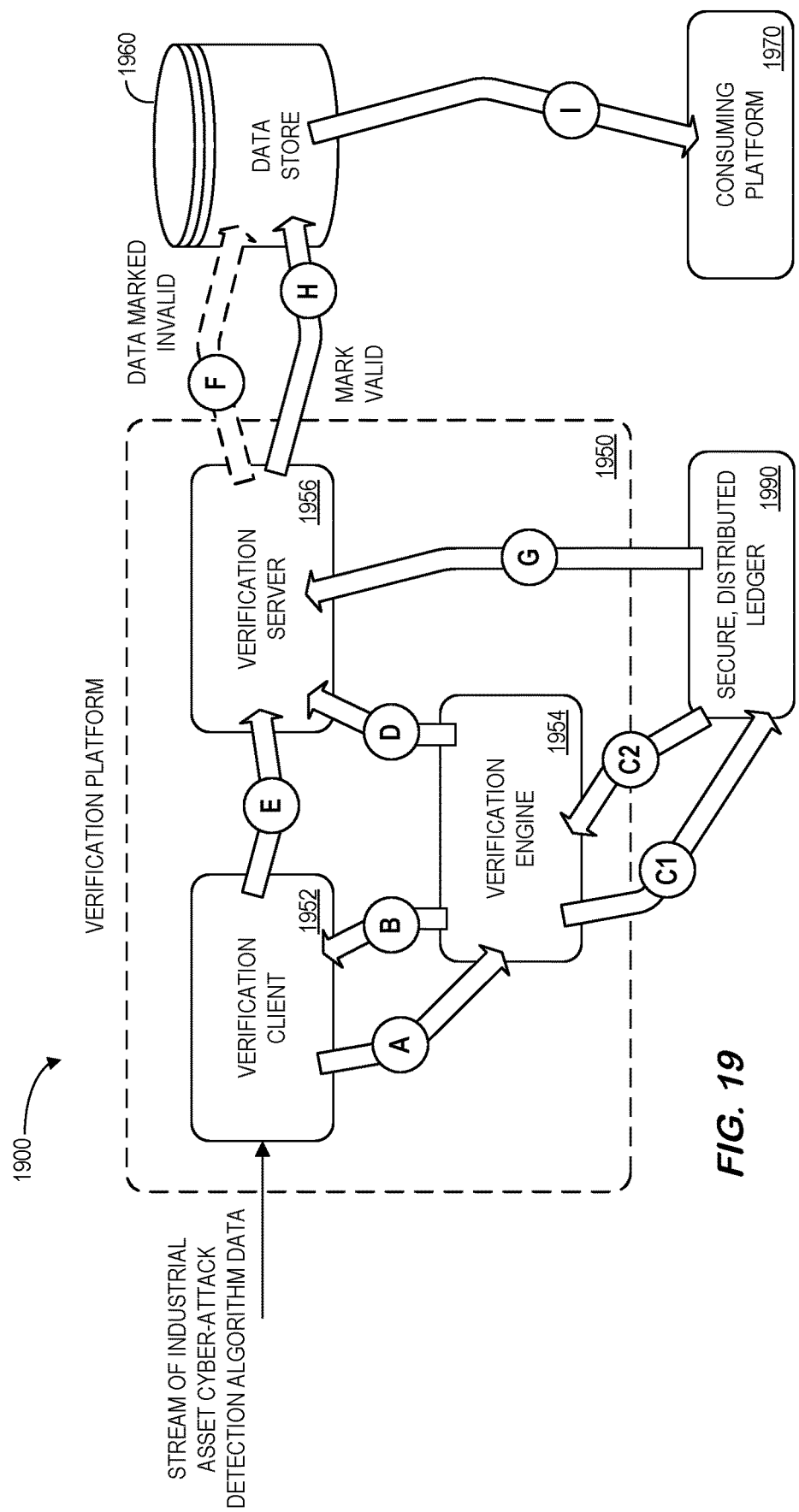
FIG. 19 is a more detailed process for industrial asset cyber-attack detection algorithm verification in accordance with some embodiments.

At 1730, the verification platform may record a hash value associated with a compressed representation of the subset of industrial asset cyber-attack detection algorithm data combined with metadata in a secure, distributed ledger. Although other types of compressed representations of data might be used, according to some embodiments the compressed representation of the subset of industrial data combined with "metadata" is a trie. Note that the metadata might include, for example, a pseudo identifier, a time stamp, a unique client identifier, data shape information (e.g., the depth and/or width of the data), etc. FIG. 18 is one example of a type of a trie 1800 that may be used as a compressed representation of industrial data according to some embodiments. As used herein, the term "trie" may refer to a radix tree which is an ordered search tree data structure that can be used to store a dynamic set or associative array (and the keys might comprise, for example, strings). Note that descendants of a node 1810 in the trie 1800 have a common prefix of the string associated with that node 1810, and the root may be associated with an empty string. The example of FIG. 18 stores eight strings: "pat," "patent," "patenting," "patented," "patrick," "trade, "trades," and "trademark." From the root node 1810, the bold arrows in FIG. 18 representing a search combine "pat," "ent," and "ed" to form the string "patented." Note that each node 1810 in the trie 1800 has at most two child nodes (referred to as a "binary" trie or a trie with a radix of "2").

Referring again to FIG. 17, at 1740 the verification platform may receive a transaction identifier from the secure, distributed ledger. At 1750, the verification platform may mark the subset of industrial asset cyber-attack detection algorithm data in the data store as being valid after using the transaction identifier to verify that the recorded hash value matches a hash value associated with an independently created version of the compressed representation of the subset of industrial asset cyber-attack detection algorithm data combined with metadata. A consuming platform can then utilize information marked as being valid in the data store.

In this way, a data verification platform may protect and authenticate sensor data output from industrial systems and further ensure that corrupted data does not flow to other important system. Utilizing the secure aspects of a distributed ledger, such as blockchain technologies, along with a compression data structure such as a trie, a more detailed description of a process to verity industrial data is provided in connection with the system of FIG. 19. The system 1900 includes a verification platform 1950 comprised of a verification client 1952 that receives a stream of industrial asset cyber-attack detection algorithm data, a verification engine 1954, and a verification server 1956 that store data into a data store 1960.

The verification client 1952 initially establishes a connection with an industrial asset and waits for data to be sent over. Once the verification client 1952 receives a packet of data, it utilizes a data structure (e.g., a trie) to store the data. As described with respect to FIG. 21, according to some embodiments a "Patricia-Merkle" trie may store data using a key-value pairing within a trie structure. The key might be based on, for example, a timestamp of when the first item of the data packet was read along the data shape. A feature of this structure is that a special hash may be linked with the root node of the data structure that identifies each trie. As a result, the hash may act as a fingerprint for the entire structure and that changes automatically when any data is modified within the trie. After storing the data, the verification client 1952 sends the hash to the verification engine 1954 at (A) and listens for a "pseudo identifier" at (B). The pseudo identifier might comprise a unique identifier that will be linked with all the data built in that specific trie. The client then sends the data packet and associated metadata to the verification server at (E).

The verification engine 1954 may be initially connected to the verification client 1952 and listen for a data packet containing the hash of the trie created by the verification client 1952. Once the hash is received, the verification engine 1954 sends back a pseudo identifier. The verification engine 1954 may then store or record the hash into a secure, distributed ledger 1990 at (C1) and receive back a transaction identifier at (C2) that can be used to monitor the stored hash in the ledger 1990 (e.g., blockchain). Next, the verification engine 1954 closes the connection with the verification client 1952 and opens a connection with the verification server 1956. Once that connection is open, the verification engine 1954 may send the transaction identifier and pseudo identifier to the verification server 1956 at (D) and the verification server 1956 can utilize both identifiers accordingly.

The verification server 1956 may continuously listen to both the verification client 1952 and the verification engine 1954 waiting for information. First, the verification server 1956 may receive the transaction identifier and the pseudo identifier from the verification engine 1954 at (D) and store them for future use. The verification server 1956 may also receive the data packet that was sent from the verification client 1952 at (E) and store it into a data store 1960 at (F). At this point, all the data is invalid and is marked as such in the data store (as illustrated by the dashed arrow in FIG. 19). Afterwards, the verification server 1956 may build its own trie from the received data, which will also have a hash value. In order to check if the data is valid, the verification server 1956 compares the current hash to the hash stored in the ledger 1990 at (G). Using the stored transaction identifier, the verification server 1956 is able to retrieve the hash from the distributed ledger 1990 and compare the hash from the ledger 1990 with the hash that was locally created. If the two values match, the verification server 1956 validates the data associated with that hash using the stored pseudo identifier by marking the data as valid in the data store 1960 at (H) (if there is no match, the data remains invalidated in the data store 1960). Note that any consuming platform 1970 may read validated data from the data store 1960 at (I), including platforms associated with cyber-attack detection.

In this way, the system 1900 may help ensure that the data received by controllers and operators is indeed anchored in time and has been verified. According to some embodiments, this is achieved through utilizing secure infrastructures, such as blockchains and cryptographically protected compression data structures (e.g., a Patricia-Merkle trie) to safeguard the data. Furthermore, embodiments may let a user know exactly when data has been changed and also help the user respond as soon as possible.

Figure 20:
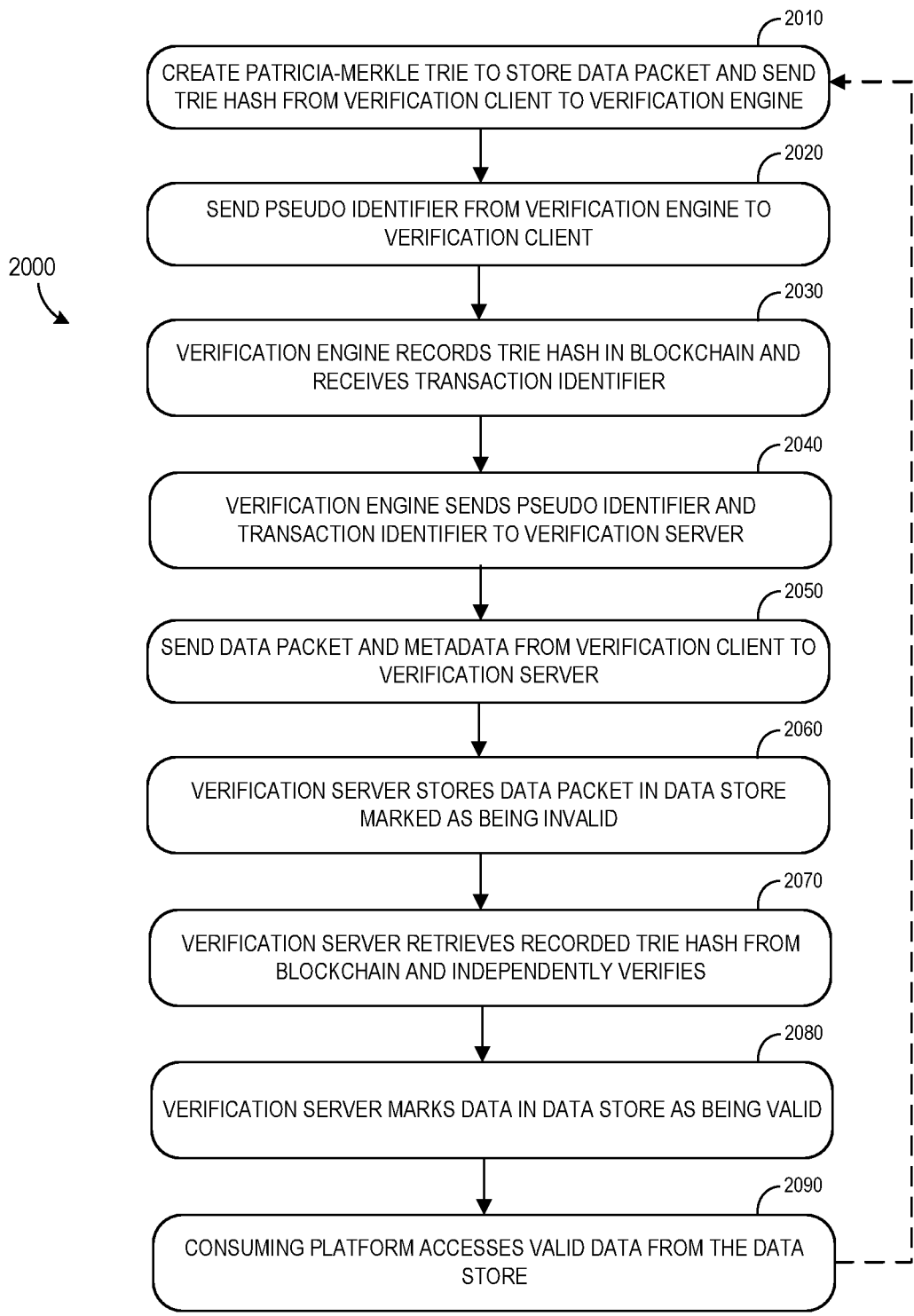
FIG. 20 is a more detailed method for industrial asset cyber-attack detection algorithm verification according to some embodiments.
Figure 21:
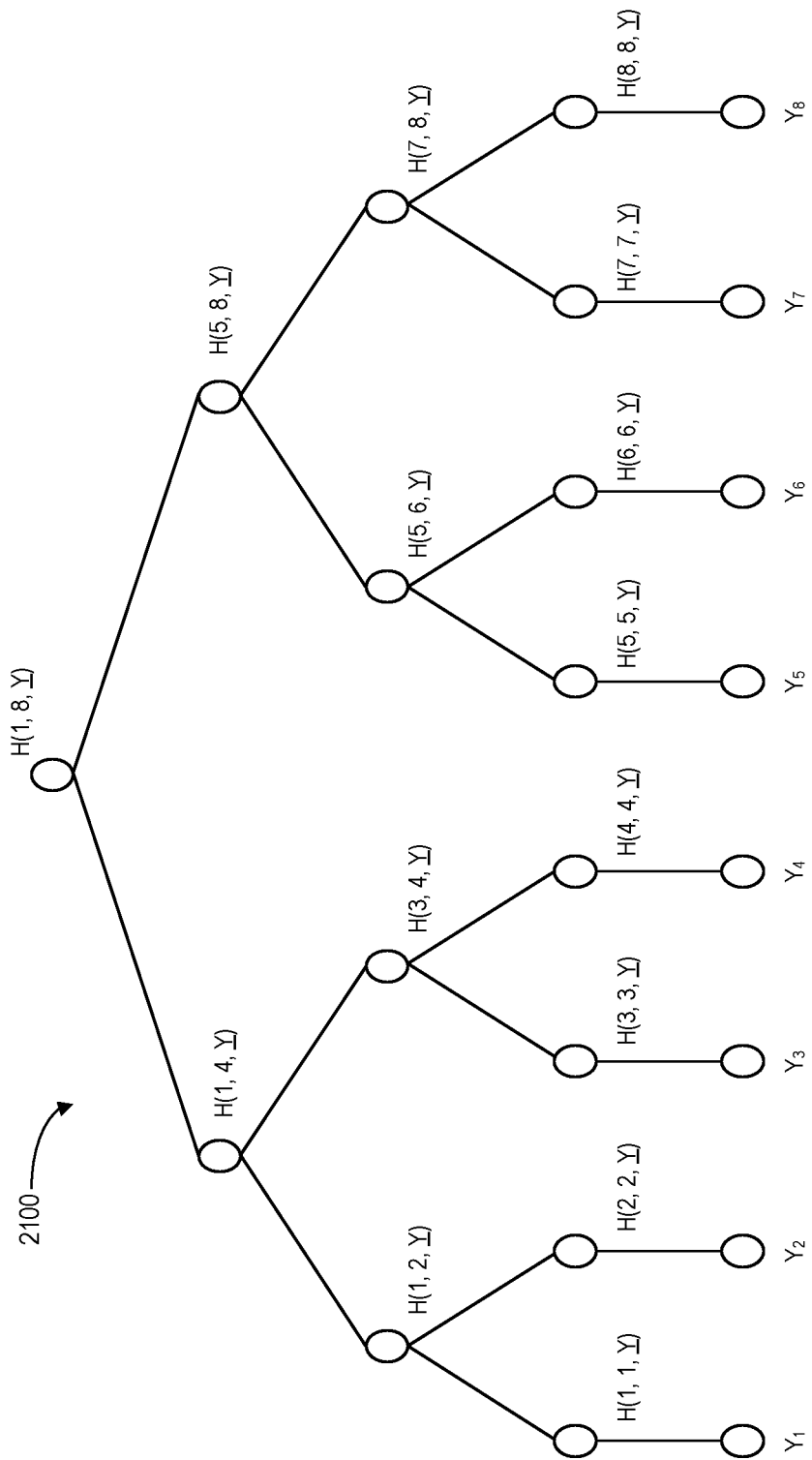
FIG. 21 illustrates a Merkle tree according to some embodiments.

FIG. 20 is a more detailed method 2000 for industrial asset cyber-attack detection algorithm verification according to some embodiments. At 2010, a trie, such as a Patricia-Merkle trie as described with respect to FIG. 21, is created to store a received data packet a trie hash is sent from a verification client to a verification engine. At 2020, a pseudo identifier is sent from the verification engine to the verification client. At 2030, the verification engine records the trie hash in a blockchain and receives from the blockchain a transaction identifier. At 2040, the verification engine sends the pseudo identifier and transaction identifier to a verification server. At 2050, the verification client sends the data packet (e.g., containing monitoring node or decision boundary data) and associated meta-data to the verification server. At 2060, the verification server stores the data packet in a data store marked as being invalid. At 2070, the verification server retrieves the recorded trie hash from the blockchain and independently verifies that it matches a locally created hash value. Assuming the two hash values match, at 2080 the verification server marks in the data in the data store as being valid. At 2090, a consuming platform may access valid data from the data store (e.g., to facilitate cyber-attack detection and/or remediation) and the process continues at 2010.

According to some embodiments, the lossless protection procedure might be associated with a "Merkle tree." FIG. 21 illustrates a Merkle tree 2100 that may be used in a digital signature system where the security of the system depends on the security of a conventional cryptographic function. The tree 2100 may provide a digital signature of the type which generates a secret number $X_i$, where $X_i = x_{i1}$, $x_{i2}$, $x_{i3}$ ... $x_{in}$ computes $Y_i = F(X_i)$ and transmits part of $X_i$ to a receiver as the digital signature. According to some embodiments, the authentication tree 2100 uses an authentication tree function comprising a one-way function of the $Y_i$. The root of the authentication tree and the authentication tree function may be authenticated at the receiver. The $Y_1$ and the corresponding authentication path values of the authentication tree may be transmitted from the transmitter to the receiver, and the $Y_1$ may be authenticated at the receiver by computing the authentication path of the authentication tree between the $Y_1$ and the rest of the authentication tree. In the example of FIG. 21, n is equal to 8.

To implement a "tree authentication" method for a vector of data items $Y = Y_1, Y_2, \ldots Y_n$ a method is provided to authenticate a randomly chosen $Y_i$. To authenticate the $Y_i$, define the function H(I, j, Y) as follows:

$$H(i,i,Y) = F(Y_i)$$

$$H(i,j,Y) = F(H(i,i+j-1/2,Y), H(i+j+1)/2,j,Y))$$

where $F(Y_i)$ is a one-way function. H(i, j, Y) is a one-way function of $Y_i$, $Y_{i+1}$ ... $Y_j$ and H(1, n, Y) can be used to authenticate $Y_1$ through $Y_n$. H(1, n, Y) is a one-way function of all the $Y_1$ (H(1, n, Y) might comprise, by way of example only, 10 bits of data). In this way, a receiver may selectively authenticate any "leaf," Yi, of the binary tree 2100 defined with the function H(i, n, Y).

For example, the sequence of recursive calls required to compute the root, H(1, 23, Y) of the binary tree 2100 is shown in FIG. 21. Once the root H(1, 8, Y) is computed, it is authenticated to the receiver along with the function H( ). To authenticate any $Y_i$, such as $Y_5$, the transmitter and receiver may perform the following:

(a) H(1, 8, Y) is already known and authenticated.
(b) H(1, 8, Y)=F(H(1, 4, Y), H(5, 8, Y)). Send H(1, 4, Y) and H(5, 8, Y) and let the receiver compute H(1, 8, Y)=F(H(1, 4, Y), H(5, 8, Y)) and confirm H(5, 8, Y) is correct.
(c) The receiver has authenticated H(5, 8, Y). Send H(5, 6, Y) and H(7, 8, Y) and let the receiver compute H(5, 8, Y)=F(H(5, 6, Y), H(7, 8, Y) and confirm H(5, 6, Y) is correct.

(d) The receiver has authenticated H(5, 6, Y). Send H(5, 5, Y) and H(6, 6, Y) and let the receiver compute H(5, 6, Y)=F(H(5, 5, Y), H(6, 6, Y)) and confirm H(5, 5, Y) is correct.

(e) The receiver has authenticated H(5, 5, Y). Send $Y_5$ and let the receiver compute H(5, 5, Y)=F($Y_5$) and confirm it is correct.

(f) The receiver has authenticated $Y_5$.

Some embodiments described herein utilize a specific type of Merkle tree referred to as a Practical Algorithm To Retrieve Information Coded In Alphanumeric ("PATRICIA") or a Patricia-Merkle trie. A Patricia-Merkle trie may provide a cryptographically authenticated data structure that can be used to store all (key, value) bindings. They may be fully deterministic, meaning that a Patricia trie with the same (key, value) bindings is guaranteed to be exactly the same down to the last byte and therefore have the same root hash. Moreover, a Patricia-Merkle trie may provide O(log(n)) efficiency for inserts, lookups and deletes. Note that the use of a Patricia-Merkle trie as a method to compress, store, and uniquely identify data as described herein (e.g., instead of a hash table) means that there will not be any key collisions that may corrupt or overwrite existing data. Additionally, the compression properties of the Patricia-Merkle trie and the relatively low-level time and space complexity may allow for a substantial amount of data to be stored within the trie. Moreover, the system may quickly determine if the data has been corrupted. As a result, the ability to utilize the root node hash of the trie as a fingerprint of the data stored in the trie can help with validation and verification in a relatively quick fashion.

Figure 22:
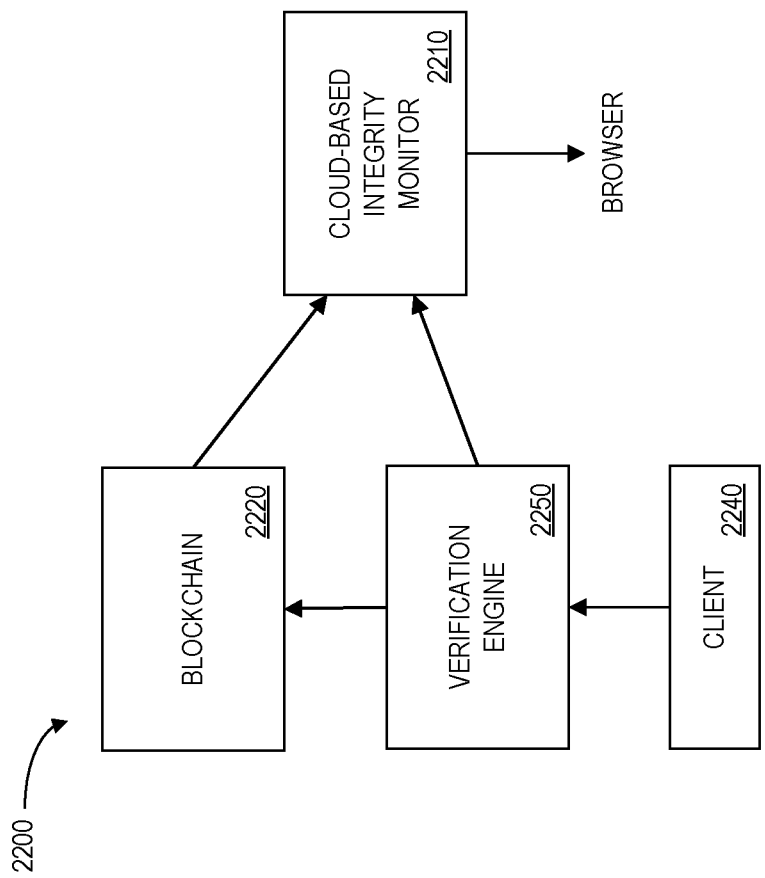
FIG. 22 is a system implementing a digital transaction with blockchain validation according to some embodiments.
Figure 23:
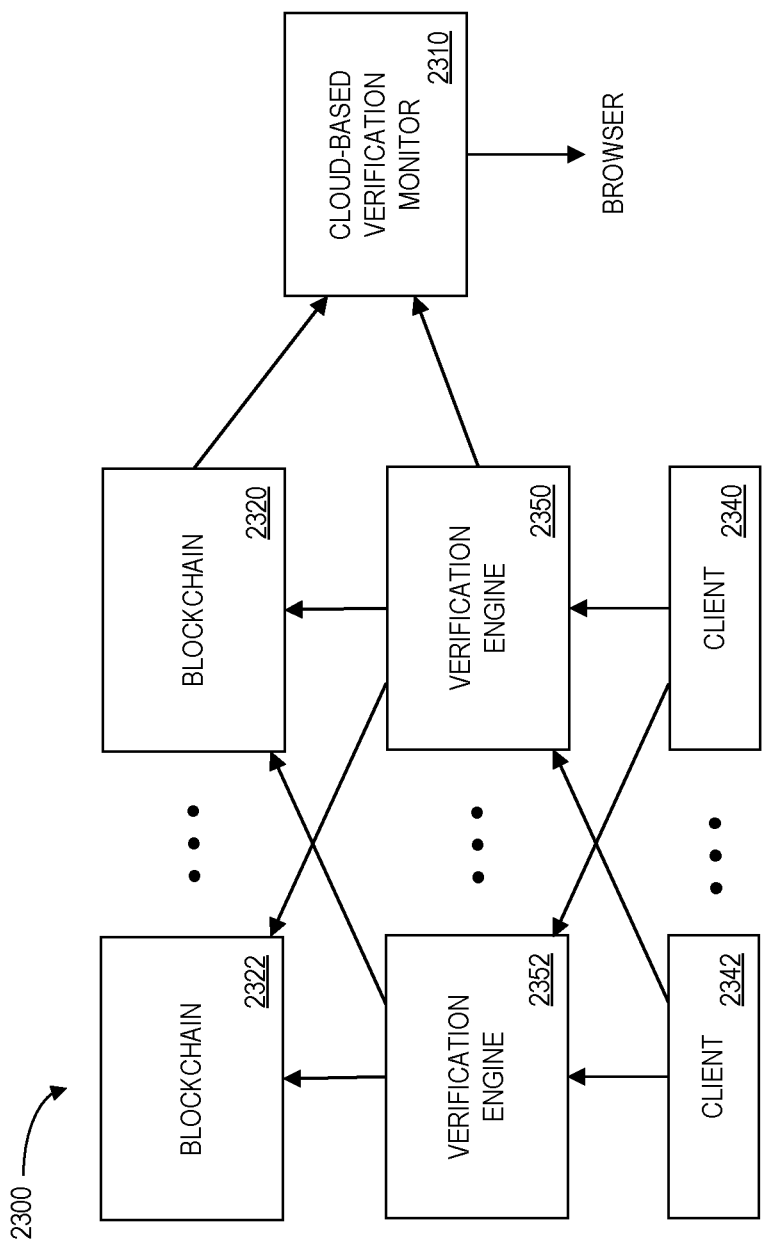
FIG. 23 is a system implementing a digital transaction with multiple digital transaction engines in accordance with some embodiments.

FIG. 22 is a system 2200 implementing industrial asset cyber-attack detection algorithm verification using blockchain validation according to some embodiments. A cloud-based integrity monitor 2210 may provide transaction integrity data via a web browser and exchange information with a blockchain 2220 and a verification engine 2250 via Representational State Transfer ("REST") web services. The REST web services may, for example, provide interoperability between computer systems on the Internet (e.g., by allowing requesting systems to access and manipulate textual representations of web resources using a uniform, predefined set of stateless operations). According to some embodiments, portions of the verification engine 2250 may be associated with a MySQL database. In this way, the verification engine 2250 and blockchain 2220 can be used to provide transaction level verification for a client 2240. Although FIG. 22 illustrates a system 2200 with a single blockchain 2220 and verification engine 2250, note that embodiments may employ other topologies. For example, FIG. 23 is a system 2300 implementing a cloud-based verification monitor 2310 to support industrial data validation using multiple verification engines in accordance with some embodiments. In particular, an additional blockchain 2322 and verification engine 2352 may provide protection for an additional client 2342. As illustrated in FIG. 23, each verification engine 2350, 2352 may be associated with multiple blockchains 2320, 2322 providing additional protection for the system 2300 (e.g., by storing information at multiple, geographically disperse nodes making attacks impractical). That is, each verifier (e.g., verification engine) may commit a brief summary to an independent data store and, once recorded, the information cannot be changed without detection to provide a tamper-proof System of Records ("SoR").

Although some embodiments are described using specific blockchain technologies, note that other approaches could be incorporated. For example, a Chainpoint platform for blockchains might be utilized to allow for the creation of a timestamp proof of the data and verify the existence and integrity of data stored in a blockchain. That is, a verification platform and the Chainpoint proof could be employed as a verification tool, rather than manually checking if the hashes match at a verification server.

Figure 24:
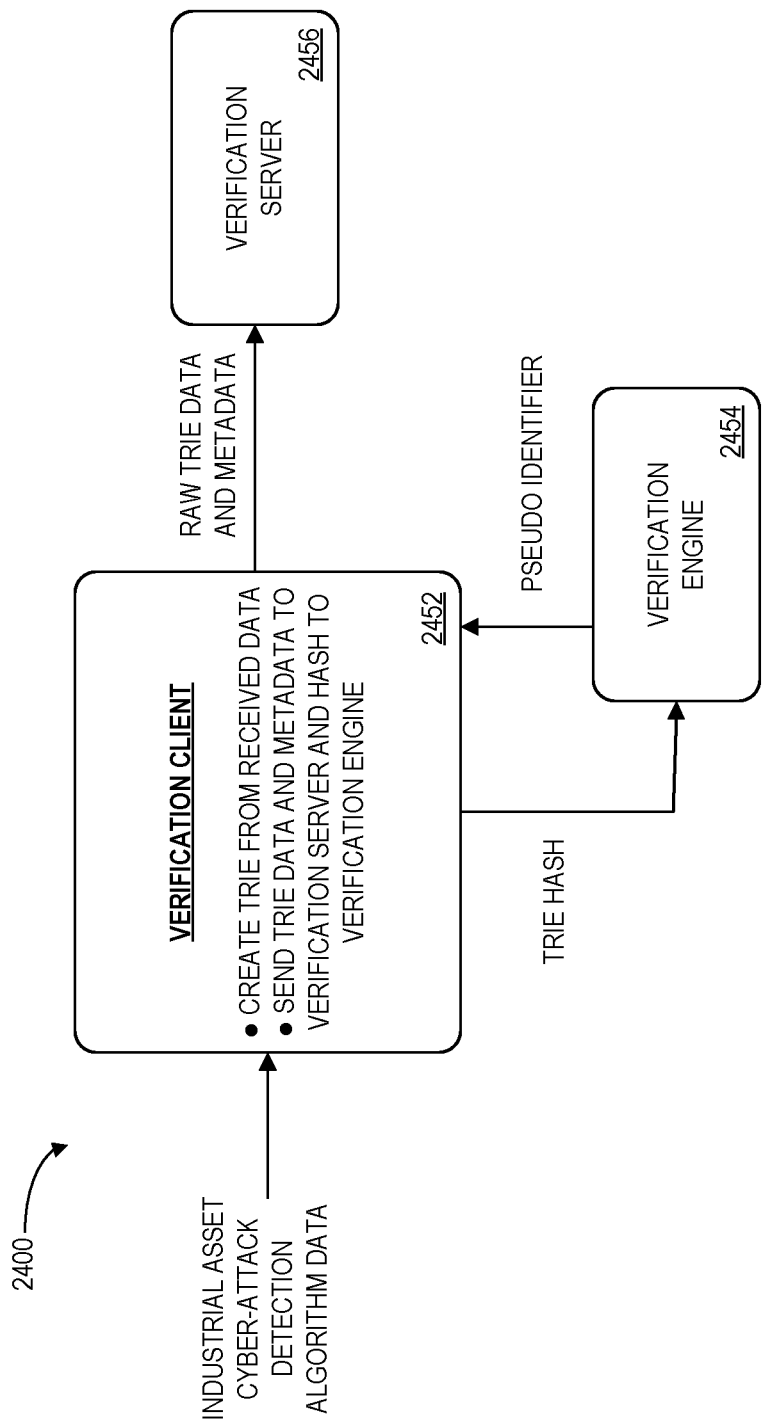
FIG. 24 is a high-level block diagram of a verification client system according to some embodiments.
Figure 25:
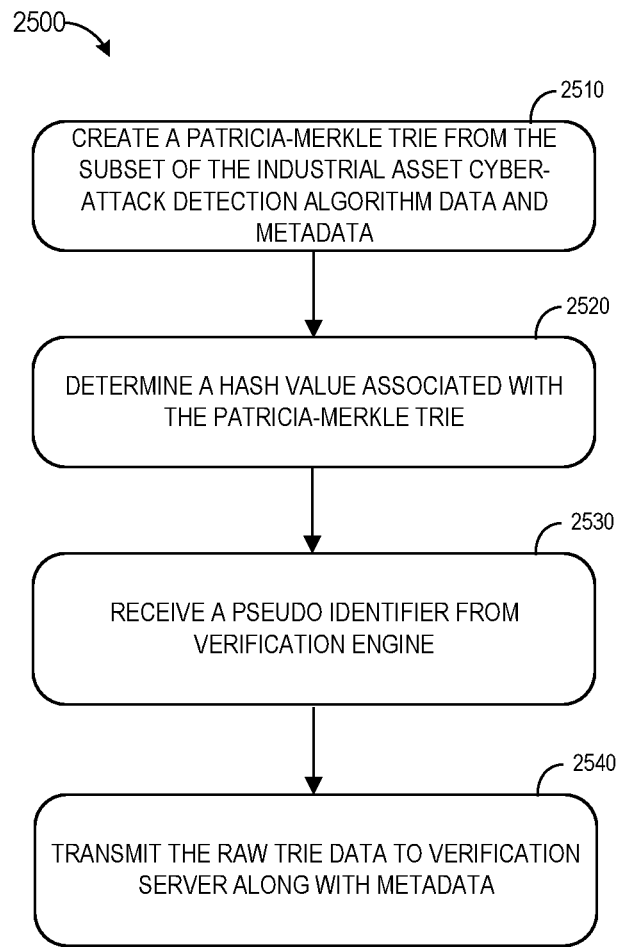
FIG. 25 is a verification client method in accordance with some embodiments.

FIG. 24 is a high-level block diagram of a verification client system 2400 according to some embodiments. The system 2400 includes a verification client 2452 with a data connection that receives a stream of industrial asset cyber-attack detection algorithm data, including a subset of the industrial asset cyber-attack detection algorithm data, from industrial asset sensors. The verification client 2452 creates a trie from the received data and sends data and associated metadata to a verification server 2456. The verification client 2452 also sends the trie hash to a verification engine 2454 and receives back a pseudo identifier. FIG. 25 is a verification client method 2500 in accordance with some embodiments. At 2510, the verification client creates a Patricia-Merkle trie from the subset of the industrial asset cyber-attack detection algorithm data and metadata. At 2520, the verification client determines a hash value associated with the Patricia-Merkle trie. At 2530, the verification client receives a pseudo identifier from a verification engine. At 2540, the verification client transmits the raw Patricia-Merkle trie data to a verification server along with metadata.

Figure 26:
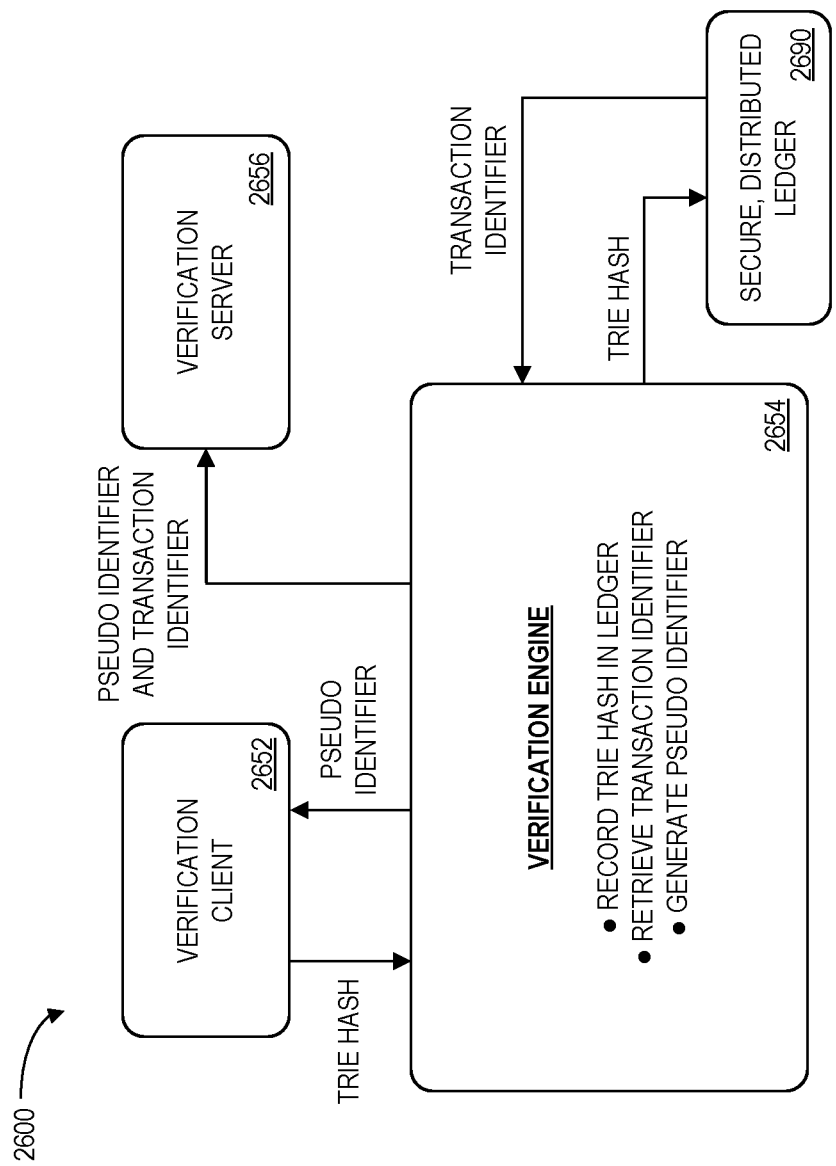
FIG. 26 is a high-level block diagram of a verification engine system according to some embodiments.
Figure 27:
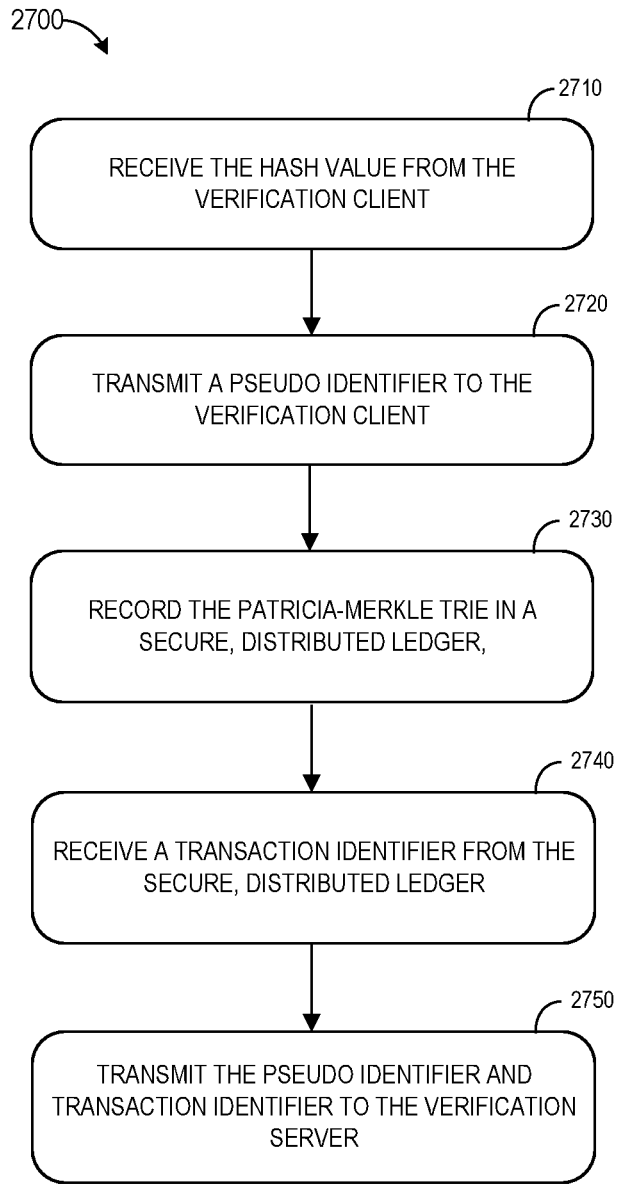
FIG. 27 is a verification engine method in accordance with some embodiments.

FIG. 26 is a high-level block diagram of a verification engine system 2600 according to some embodiments. The system 2600 includes a verification engine 2654 to receive a trie hash from a verification client 2652 and record it in a secure, distributed ledger 2690 (receiving back a transaction identifier). The verification engine 2654 also locally generates a pseudo identifier that is provided to the verification client. The verification engine also transmits the transaction identifier to a verification server 2656 along with the locally generated pseudo identifier. FIG. 27 is a verification engine method 2700 in accordance with some embodiments. At 2710, the verification engine receives a hash value from a verification client. At 2720, the verification engine transmits a locally created pseudo identifier to the verification client. At 2730, the verification engine records the trie hash in a secure, distributed ledger and receives a transaction identifier back at 2740. At 2750, the verification engine transmits the pseudo identifier and associated transaction identifier to the verification server (which can then use the pair of values to later identify an appropriate data packet).

Figure 28:
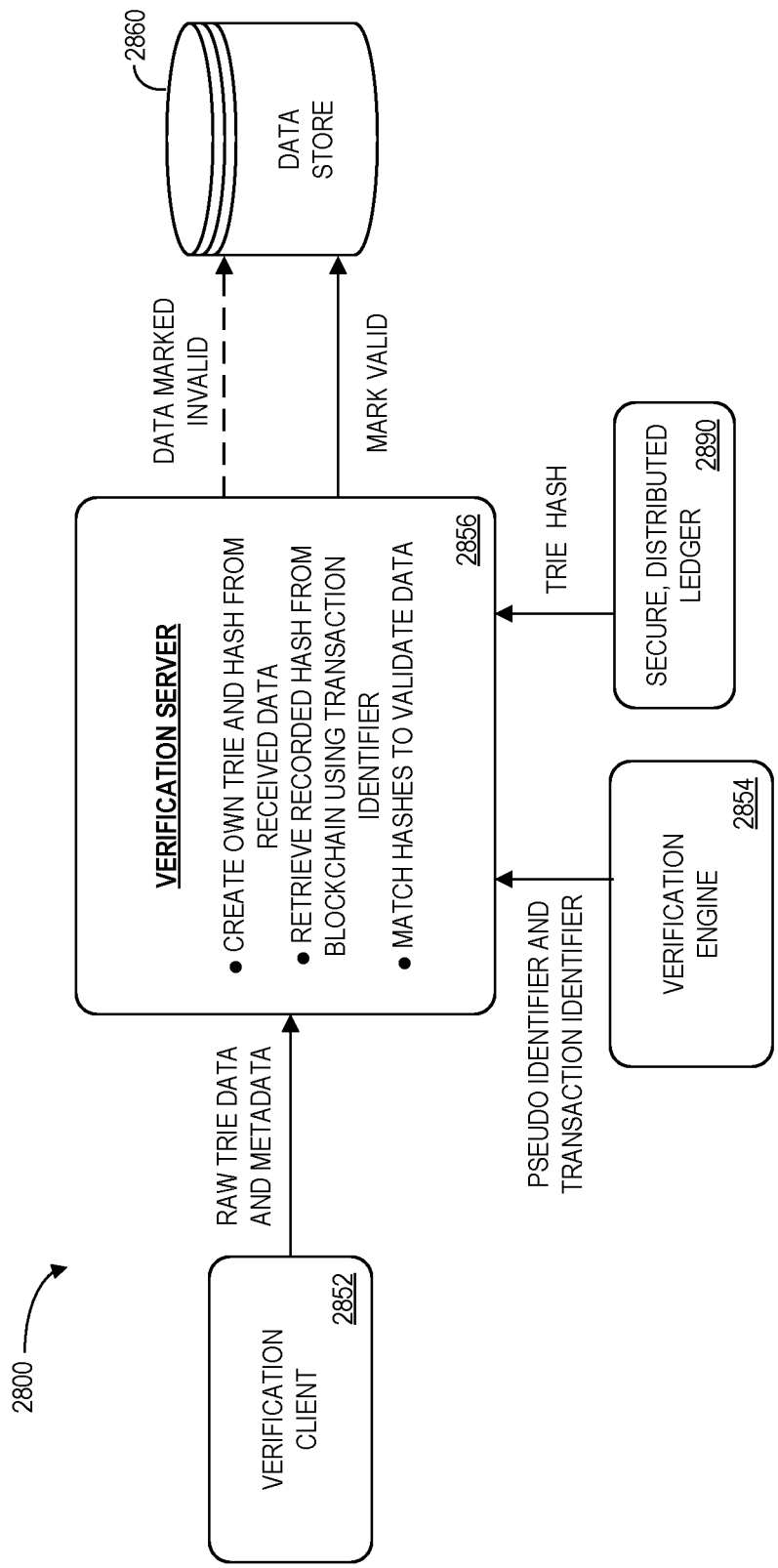
FIG. 28 is a high-level block diagram of a verification server system according to some embodiments.
Figure 29:
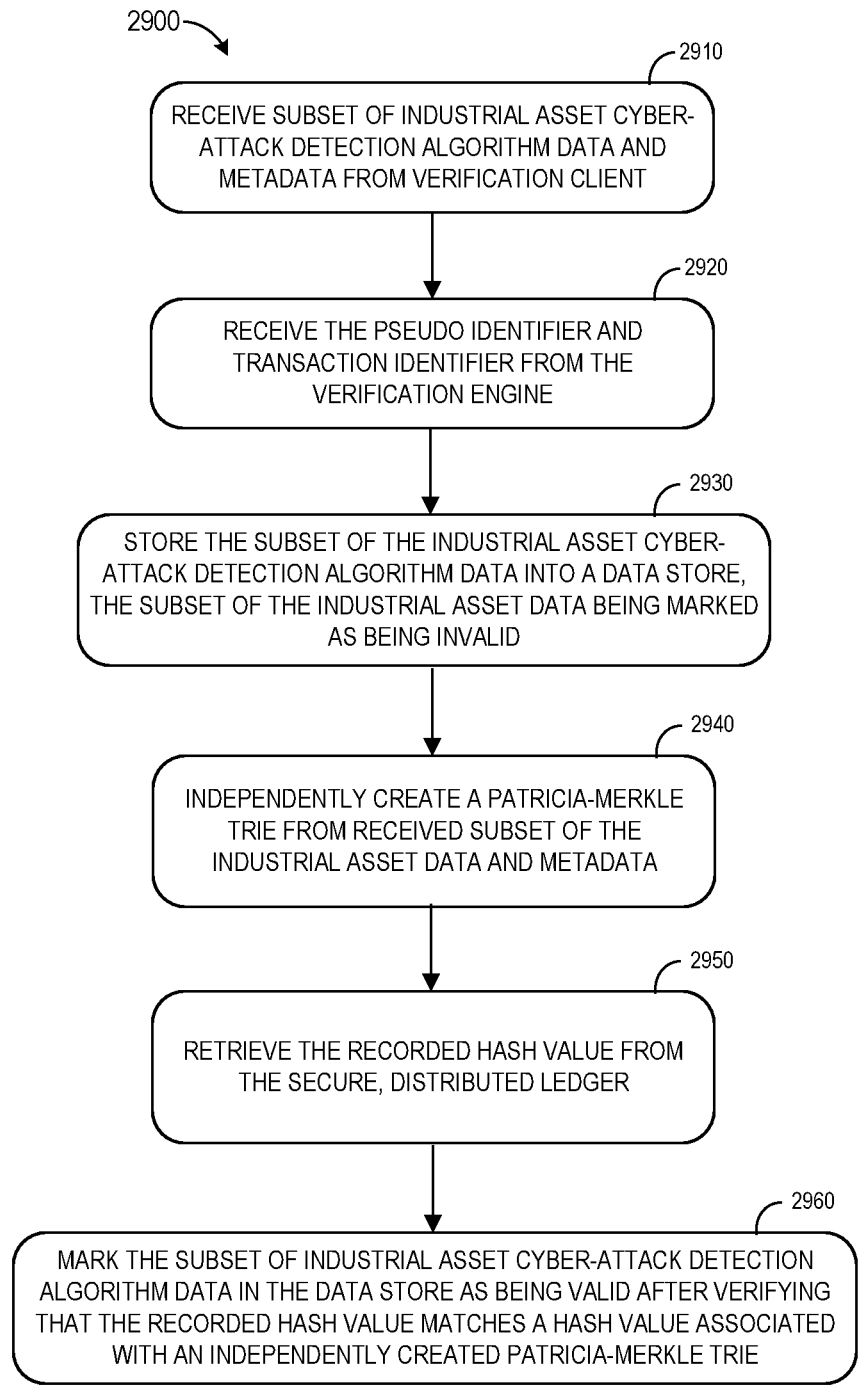
FIG. 29 is a verification server method in accordance with some embodiments.

FIG. 28 is a high-level block diagram of a verification server system 2800 according to some embodiments. The system includes a verification server 2800 that receives raw trie data and metadata from a verification client 2852 and uses that data to locally independently create a Patricia-Merkle trie (and associated hash value). That is, the trie is created separately from the trie that was created by the verification client 2852. The transaction server also receives a pseudo identifier and transaction identifier from a verification engine 2854 and retrieves a trie hash that was previously recorded in a secure, distributed ledger 2890 by the verification engine 2854. The verification server initially writes the data packet into a data store 2860 marked as being invalid. If the locally determined hash value matches the hash value received from the secure, distributed ledger 2890, the verification server 2856 then updates the data store 2860 by marking the data as being valid. FIG. 29 is a verification server method 2900 in accordance with some embodiments. At 2910, a verification server may receive the subset of the industrial asset cyber-attack detection algorithm data and metadata from a verification client. At 2920, the client may receive the pseudo identifier and transaction identifier from a verification engine. The verification server may then store the subset of the industrial asset cyber-attack detection algorithm data into a data store at 2930, with the subset of the industrial asset cyber-attack detection algorithm data being marked as being invalid. At 2940, the verification engine may independently create a Patricia-Merkle trie from the received subset of the industrial asset cyber-attack detection algorithm data and metadata. At 2950, the verification server may retrieve the recorded hash value from a secure, distributed ledger. The verification server may then mark the subset of industrial asset cyber-attack detection algorithm data in the data store as being valid at 2960 after verifying that the recorded hash value matches a hash value associated with the independently created Patricia-Merkle trie.

Figure 30:
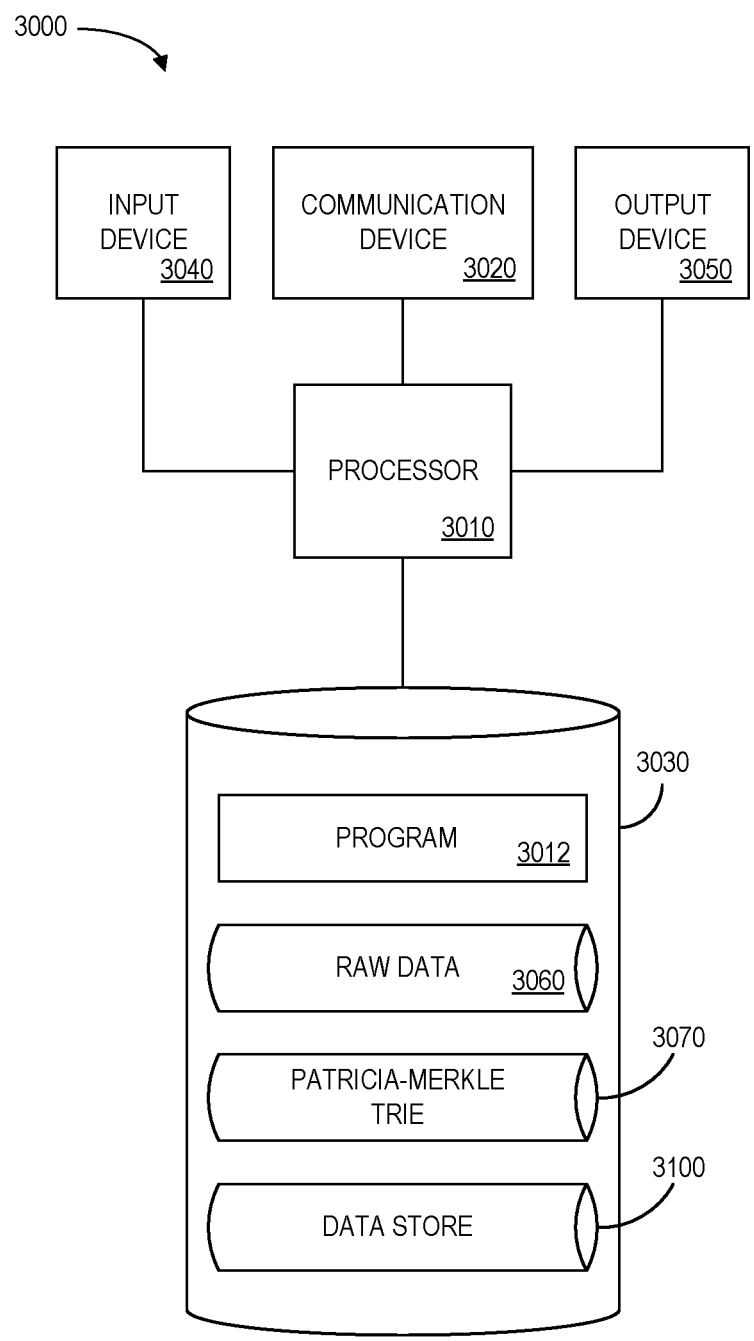
FIG. 30 illustrates a platform according to some embodiments.

Embodiments described herein may comprise a tool that facilitates industrial asset cyber-attack detection algorithm verification and may be implemented using any number of different hardware configurations. For example, FIG. 30 illustrates a platform 3000 that may be, for example, associated with the system 1600 of FIG. 16 (as well as other systems described herein). The platform 3000 comprises a processor 3010, such as one or more commercially available Central Processing Units ("CPUs") in the form of one-chip microprocessors, coupled to a communication device 3020 configured to communicate via a communication network (not shown in FIG. 30). The communication device 3020 may be used to communicate, for example, with one or more remote industrial assets, data stores, ledgers, etc. Note that communications exchanged via the communication device 3020 may utilize security features, such as those between a public internet user and an internal network of an insurance enterprise. The security features might be associated with, for example, web servers, firewalls, and/or PCI infrastructure. The platform 3000 further includes an input device 3040 (e.g., a mouse and/or keyboard to enter information about a distributed ledger, an industrial asset, etc.) and an output device 3050 (e.g., to output status reports, generate alert messages, etc.).

The processor 3010 also communicates with a storage device 3030. The storage device 3030 may comprise any appropriate information storage device, including combinations of magnetic storage devices (e.g., a hard disk drive), optical storage devices, mobile telephones, and/or semiconductor memory devices. The storage device 3030 stores a program 3012 and/or network security service tool or application for controlling the processor 3010. The processor 3010 performs instructions of the program 3012, and thereby operates in accordance with any of the embodiments described herein. For example, the processor 3010 may receive a stream of industrial asset cyber-attack detection algorithm data, including a subset of the industrial asset cyber-attack detection algorithm data. The processor 3010 may store the subset into a data store (the subset of industrial asset cyber-attack detection algorithm data being marked as invalid) and record a hash value associated with a compressed representation of the subset of industrial asset cyber-attack detection algorithm data combined with metadata in a secure, distributed ledger. The processor 3010 may then receive a transaction identifier from the secure, distributed ledger and mark the subset of industrial asset cyber-attack detection algorithm data in the data store as being valid after using the transaction identifier to verify that the recorded hash value matches a hash value of an independently created version of the compressed representation of the subset of industrial asset cyber-attack detection algorithm data combined with metadata.

The program 3012 may be stored in a compressed, uncompiled and/or encrypted format. The program 3012 may furthermore include other program elements, such as an operating system, a database management system, and/or device drivers used by the processor 3010 to interface with peripheral devices.

As used herein, information may be "received" by or "transmitted" to, for example: (i) the platform 3000 from another device; or (ii) a software application or module within the platform 3000 from another software application, module, or any other source.

In some embodiments (such as shown in FIG. 30), the storage device 3030 further stores raw data 3060 (e.g., information packets received from sensor of an industrial asset or decision boundary information), Patricia-Merkle tries 3070, and the data store 3100. An example of a database that might be used in connection with the platform 3000 will now be described in detail with respect to FIG. 31. Note that the database described herein is only an example, and additional and/or different information may be stored therein. Moreover, various databases might be split or combined in accordance with any of the embodiments described herein. For example, the raw data 3060 and Patricia-Merkle trie 3007 might be combined and/or linked to each other within the program 3012.

Figure 31:
FIG. 31 is a portion of a tabular data store in accordance with some embodiments.

Referring to FIG. 31, a table is shown that represents the data store 3100 that may be stored at the platform 3000 in accordance with some embodiments. The table may include, for example, entries identifying packets of data that have been received from industrial asset sensors. The table may also define fields 3102, 3104, 3106, 3108 for each of the entries. The fields 3102, 3104, 3106, 3108, 3114 may, according to some embodiments, specify: a transaction identifier 3102, a subset of industrial asset cyber-attack detection algorithm verification data 3104, a date and time 3106, and a validity indication 3108. The data store 3100 may be created and updated, for example, based on information electrically received from remote industrial assets, decision boundary creation platforms, verification clients, verification engines, and/or distributed ledger devices.

The transaction identifier 3102 may be, for example, a unique alphanumeric code identifying a packet of data that has been received from industrial asset sensors (e.g., as part of a larger stream of data). The subset of industrial asset cyber-attack detection algorithm verification data 3104 may include the actual values received from the sensors (e.g., temperatures, speeds, power levels, etc.), decision boundary information (local or global), etc. The date and time 3106 may indicate when the data was generated or received by the system. The validity indication 3108 might indicate that the data is "invalid" (not yet verified) or "valid" (e.g., the hash of an independently created Patricia-Merkle trie matched a hash value recorded in a secure, distributed ledger). The data store 3100 may be configured such that information associated with a validity indication of "valid" may be made available to remote consuming platforms.

Although specific hardware and data configurations have been described herein, note that any number of other configurations may be provided in accordance with embodiments of the present invention (e.g., some of the information described herein may be combined or stored in external systems). Similarly, the displays shown and described herein are provided only as examples, and other types of displays and display devices may support any of the embodiments.

Figure 32:
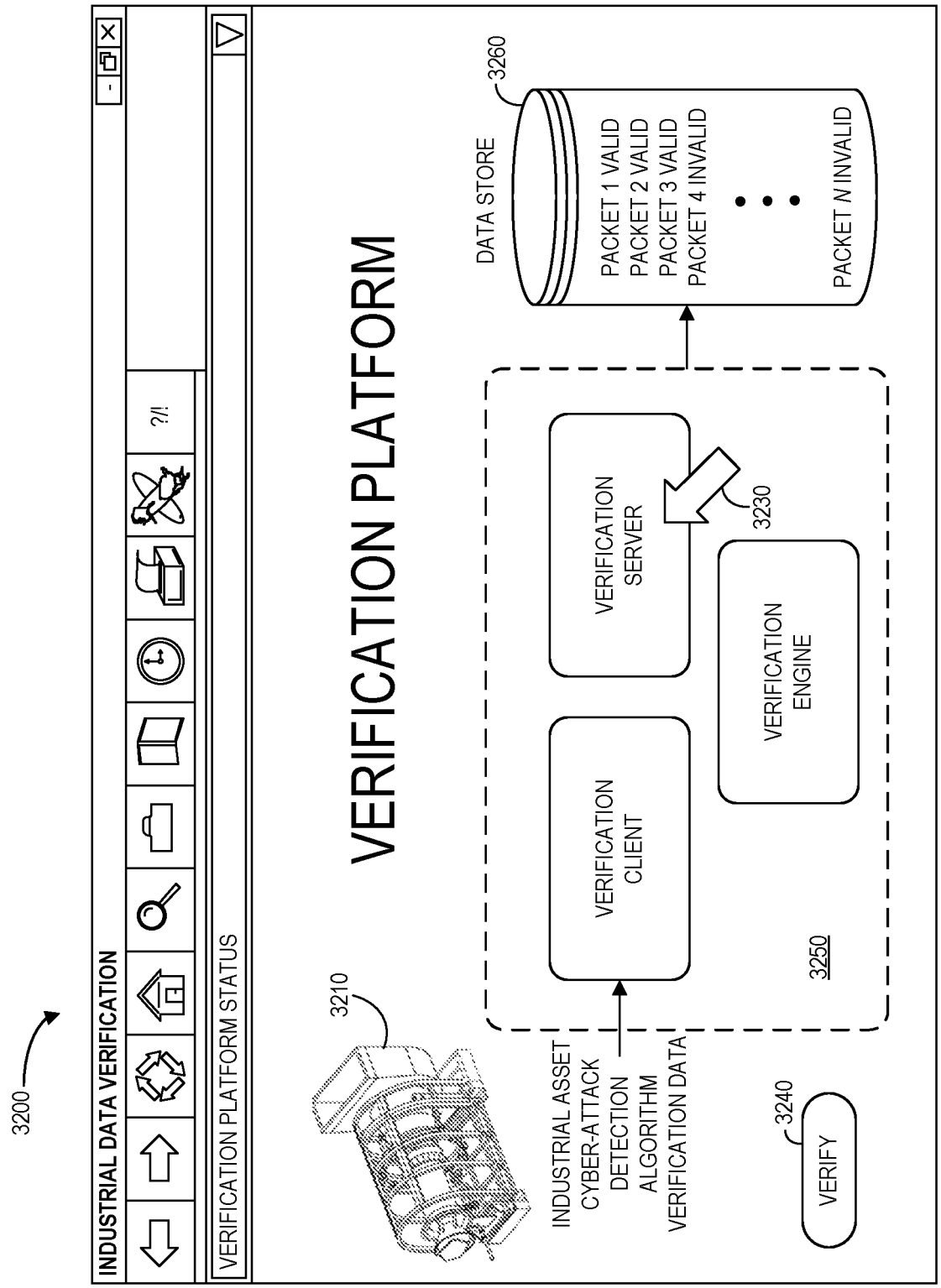
FIG. 32 illustrates a computer display in accordance with some embodiments.

For example, FIG. 32 illustrates a verification platform display 3200 that might utilize an interactive graphical user interface. The display 3200 might comprise a graphical overview of a verification system including an industrial asset 3210, a verification platform 3250 (including a verification client, engine, and server), and a data store 3260. The data store 3260 might indicate, according to some embodiments, which data packets have been received from sensors of the industrial asset 3210 (or decision boundary information) along with a valid/invalid indication reflecting if each packet has been validated. Selection of an element on the display 3200 (e.g., via a touch screen or computer mouse pointer 3230) might result in further information about that element (and, in some cases, allow for an adjustment to be made in connection with that element). In addition, selection of an "Verify" icon 3240 might trigger a verification process and possibly generate an electronic message indicating that something seems to be wrong (e.g., data packets have stopped being validated) and allow for remedial action to be taken.

Figure 33:
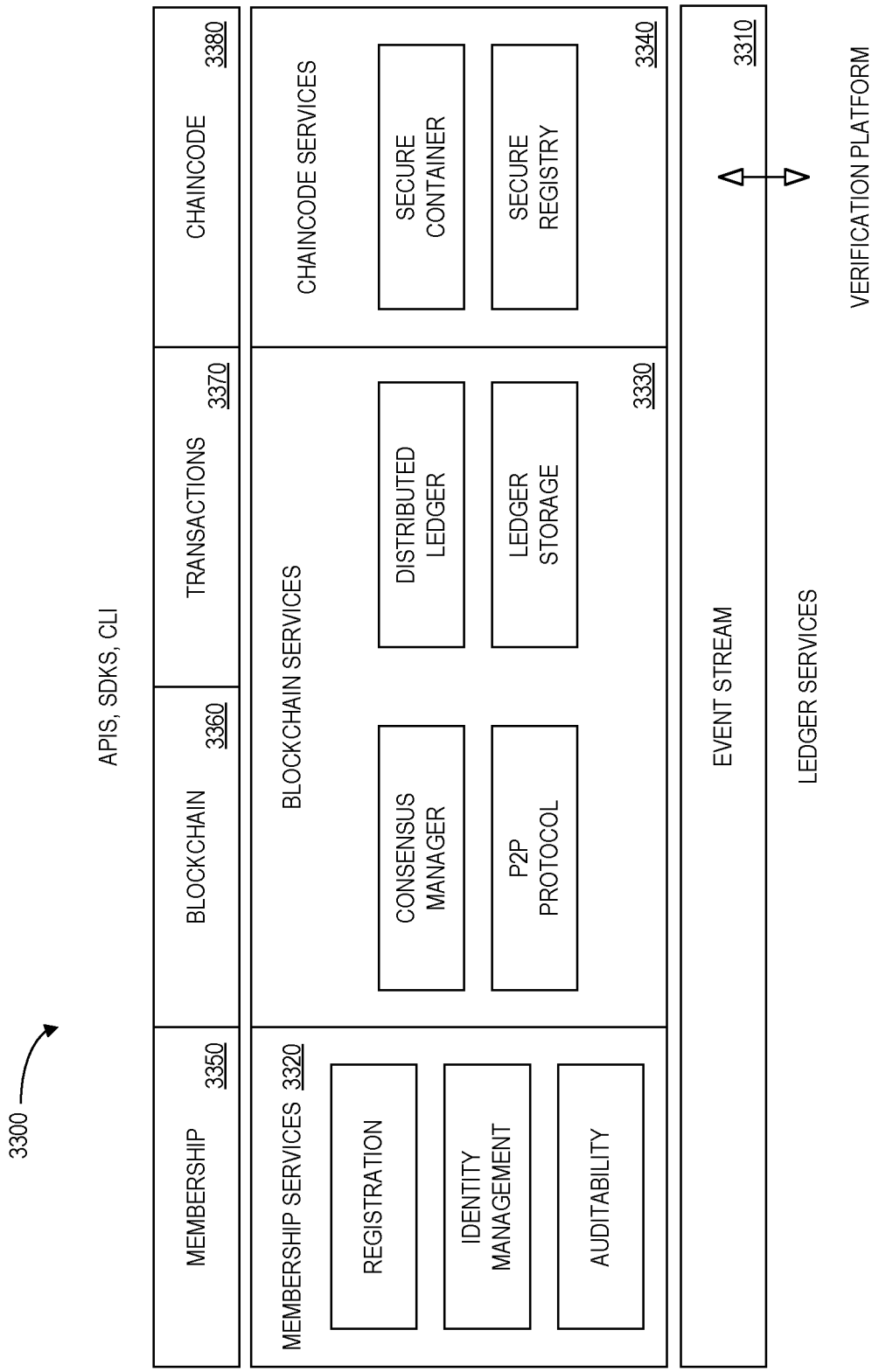
FIG. 33 is a distributed ledger reference architecture according to some embodiments.

Embodiments may be associated with any type of distributed ledger having a de-centralized consensus-based network that supports smart contracts, digital assets, record repositories, and/or cryptographic security. For example, FIG. 33 is a distributed ledger reference architecture 3300 that might be utilized by a verification platform according to some embodiments. The architecture 3300 includes ledger services and an event stream 3310 that may contain network security service information (e.g., from a digital transaction engine). Membership services 3320 (e.g., including registration, identity managements, and/or an auditability process) may manage identity, privacy, and confidentially for membership 3350 for the network security service. Blockchain services 3330 (e.g., including a consensus manager, Peer-to-Peer ("P2P") protocol, a distributed ledger, and/or ledger storage) may manage the distributed ledger through a P2P protocol built on HTTP to maintain a single state that replicated at many nodes to support blockchains 3360 and transactions 3370. Chaincode services 3340 (e.g., secure container and/or a secure registry associated with a smart contract) may help compartmentalize smart contract (or chaincode 3380) execution on validating nodes. Note that the environment may be a "locked down" and secured container with a set of signed base images that contain a secure OS and programming languages. Finally, APIs, Software Development Kits ("SDKs"), and/or a Command Line Interface ("CLI") may be utilized to support a network security service for a verification platform via the reference architecture 3300.

Thus, some embodiments described herein may have a technical advantage because the system is able to receive data from sensors and/or decision boundary information while also creating the Trie with the data received, all inline. As a result, there is no need for the system to wait until all the data is received, but rather it may start constructing the Trie while it gets data without substantial lag. Additionally, embodiments may be blockchain agnostic meaning that any type of blockchain can be used and the verification platform will still function. For example, when one blockchain is taking a very long time to confirm transactions, another (faster) blockchain may be swapped in to reduce confirmation times. Furthermore, embodiments may be applicable to any situation that needs data verification. That is, the model does not depend on the input of the data or where the input is coming from and embodiments may read data, determine the shape, create a Patricia-Merkle trie from the data, and continue with the data verification process by validating or invalidating the hash of the trie along with the associated metadata associated. In other words, there is no data type dependency associated with the embodiments described herein. In addition, embodiments may be deployed within controlled environments such as inside factories or even within industrial equipment to properly verify and authenticate data.

Figure 34:
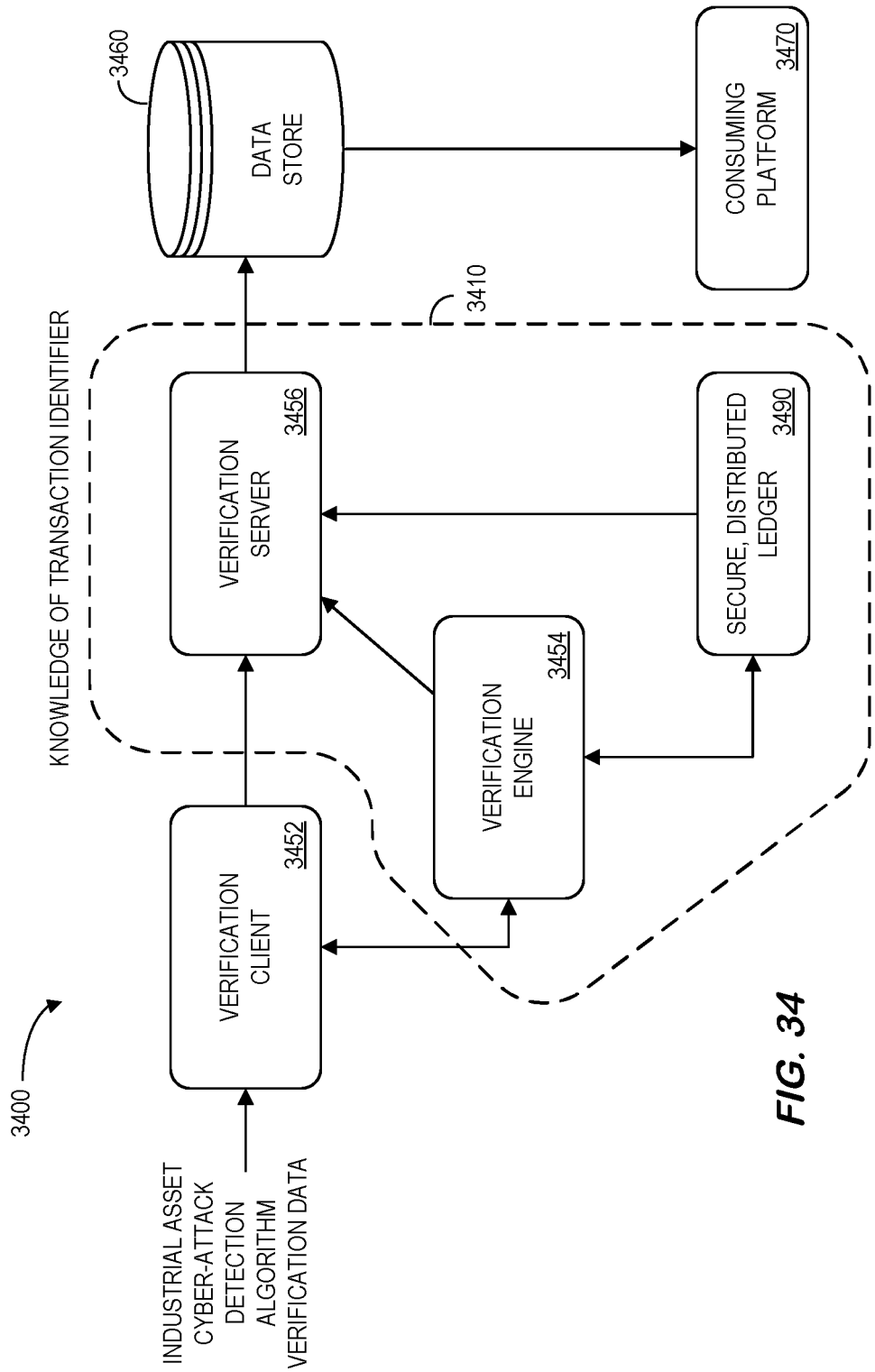
FIG. 34 illustrates which components in a system may have knowledge of the transaction identifier in accordance with some embodiments.

Note that the security of an industrial verification system may be enhanced when only certain elements of the system have knowledge of various types of information (e.g., to prevent unauthorized access to a single element from learning every type of information). For example, FIG. 34 illustrates which components in a system 3400 may have knowledge of a transaction identifier in accordance with some embodiments. The system 3400 includes a verification client 3452, a verification engine 3454, a verification server 3456, a data store 3460, a consuming platform 3470, and a secure, distributed ledger 3490. According to some embodiments previously described, only the verification engine 3454, the verification server 3456 and the secure, distributed ledger 3490 have knowledge of the transaction identifier (as illustrated by the dashed line 3410 in FIG. 34). That is, the verification client 3452, the data store 3460, and the consuming platform 3470 are unaware of the value of the transaction identifier—thus improving the security of the system 3400.

Figure 35:
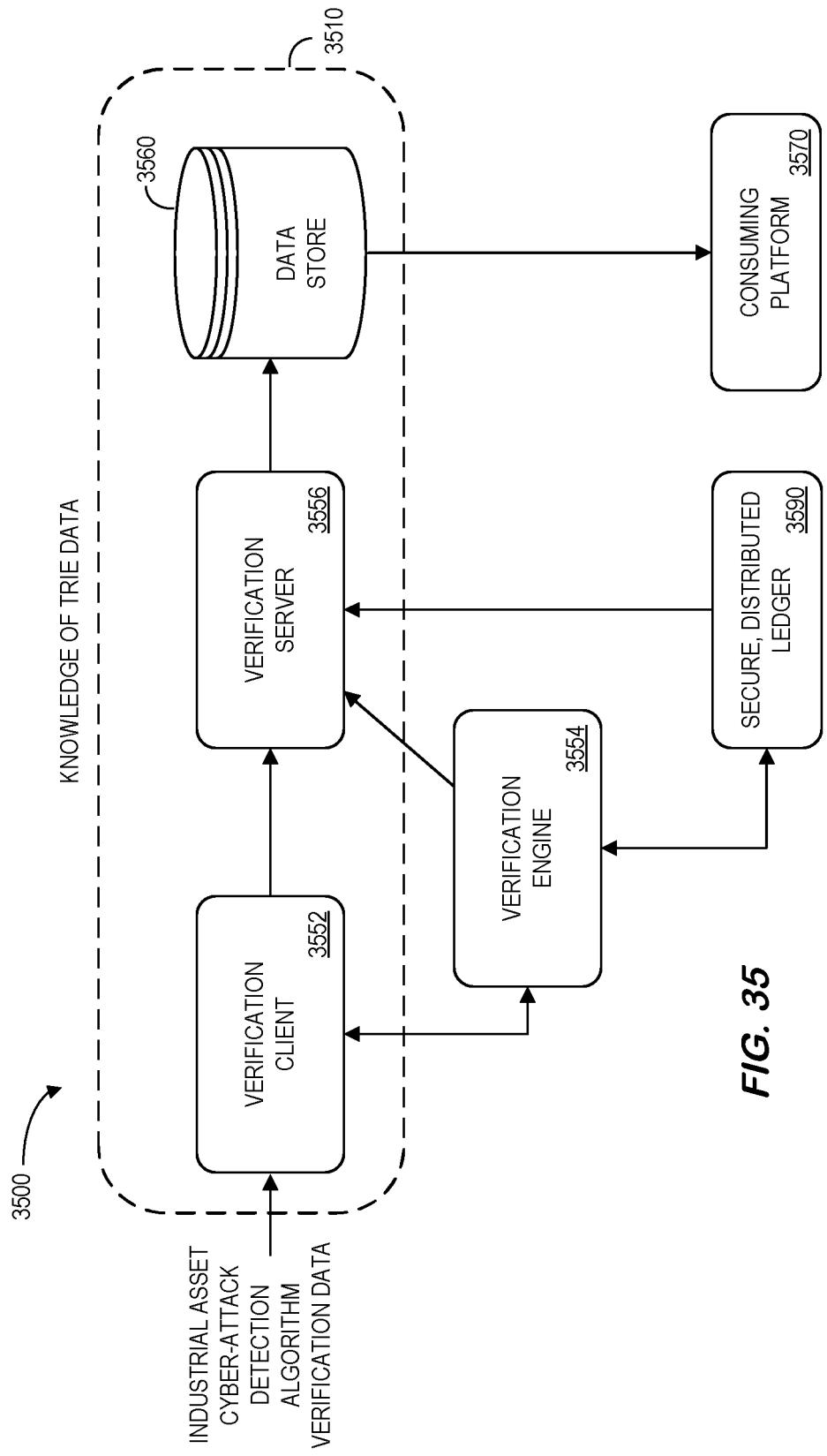
FIG. 35 illustrates which components in a system may have knowledge of trie data according to some embodiments.

As another example, FIG. 35 illustrates which components in a system 3500 may have knowledge of trie data according to some embodiments. As before, the system 3500 includes a verification client 3552, a verification engine 3554, a verification server 3556, a data store 3560, a consuming platform 3570, and a secure, distributed ledger 3590. According to some embodiments previously described, only the verification client 3552, the verification server 3556, and the data store 3560 have knowledge of the trie data (as illustrated by the dashed line 3510 in FIG. 35). That is, the verification engine 3554, the consuming platform 3570, and the secure, distributed ledger 3590 are unaware of the values of the trie data—thus improving the security of the system 3500.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 36:
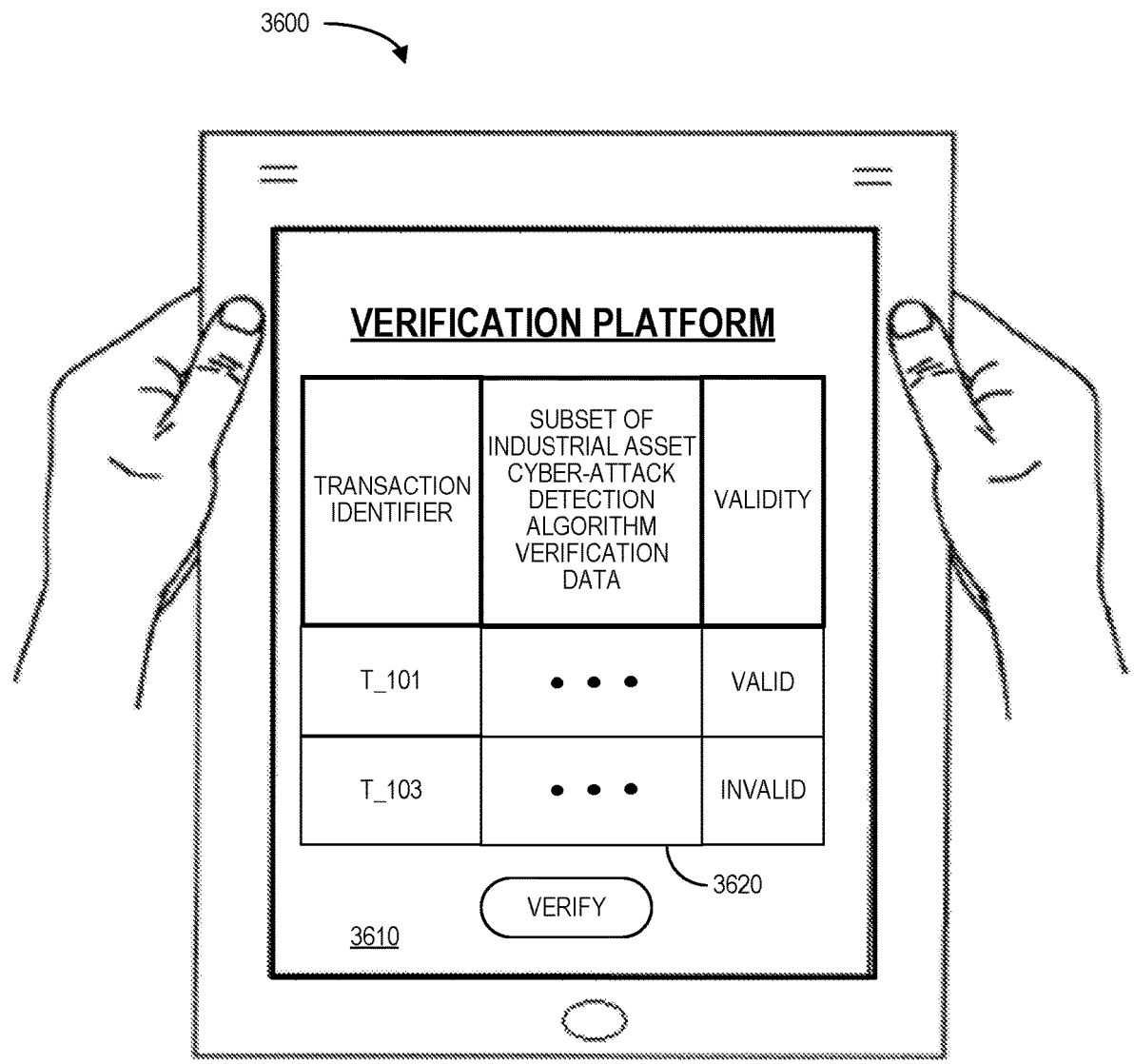
FIG. 36 illustrates a tablet computer providing a display according to some embodiments.

Some embodiments have been described with respect to information associated with an "industrial asset," which might include, for example, decision boundary data, information from sensors, actuators, controllers, etc. Moreover, note that embodiments described herein may interact with Unmanned Aerial Vehicle ("UAV") fleets, propulsion devices, healthcare scanners, etc. As another example, FIG. 36 illustrates a tablet computer 3600 providing a verification platform display 3610 according to some embodiments. In particular, the verification platform display 3610 may be an interactive user interface (e.g., via a touchscreen) and include a list of information packets or transactions 3620 containing industrial asset cyber-attack detection algorithm verification data along with an indication reflecting whether or not each packet has been verified in accordance with any of the embodiments described herein.

The present invention has been described in terms of several embodiments solely for the purpose of illustration.

Persons skilled in the art will recognize from this description that the invention is not limited to the embodiments described, but may be practiced with modifications and alterations limited only by the spirit and scope of the appended claims.

The invention claimed is:

1. A system to facilitate industrial asset cyber-attack detection algorithm verification, comprising:
   a verification platform, including:
      a data connection to receive a stream of industrial asset cyber-attack detection algorithm data, the industrial asset cyber-attacked detection algorithm data comprising at least time-series sensor data from one or more monitoring nodes of an industrial asset and including a subset of the industrial asset cyber-attack detection algorithm data, and
      at least one verification platform computer processor coupled to the data connection and adapted to:
         mark the subset of industrial asset cyber-attack detection algorithm data as invalid,
         store the subset of industrial asset cyber-attack detection algorithm data and the corresponding marking as being invalid into a data store,
         record a hash value associated with a compressed representation of the subset of industrial asset cyber-attack detection algorithm data combined with metadata in a secure, distributed ledger,
         receive a transaction identifier from the secure, distributed ledger,
         independently create a version of the compressed representation of the subset of the industrial asset cyber-attack detection algorithm data combined with the metadata based on raw trie data received from a verification client, the raw trie data comprising a time series stream of sensor data output,
         mark the subset of industrial asset cyber-attack detection algorithm data in the data store as being valid after using the transaction identifier to verify that the recorded hash value matches a hash value of the independently created version of the compressed representation of the subset of the industrial asset cyber-attack detection algorithm data combined with the metadata;
         receive decision boundary information from an abnormal detection model, the decision boundary information representing a boundary between normal operating values and abnormal operating values, the abnormal operating values occurring during a cyber-attack, the abnormal detection algorithm receiving a stream of industrial data generated by a monitoring node;
         compare data points of the stream of industrial data to the decision boundary information; and
         generate at least one of a global alert signal or a local alert signal based on the result of the comparison.

2. The system of claim 1, wherein the industrial asset cyber-attack detection algorithm data includes at least one feature-based classification boundary.

3. The system of claim 1, the stream of industrial asset data including a subset of the industrial asset data,
   the verification platform computer is further adapted to:
      store the subset of industrial asset data into the data store, the subset of industrial asset data being marked as invalid,
      record a hash value associated with a compressed representation of the subset of industrial asset data combined with metadata in the secure, distributed ledger,
      receive a transaction identifier from the secure, distributed ledger, and
      mark the subset of industrial asset data in the data store as being valid after using the transaction identifier to verify that the recorded hash value matches a hash value of an independently created version of the compressed representation of the subset of industrial asset data combined with metadata.

4. The system of claim 3, wherein the industrial asset sensors are associated with at least one of: (i) an engine, (ii) an aircraft, (iii) a locomotive, (iv) power generation, and (v) a wind turbine.

5. The system of claim 1, further comprising:
   the data store, wherein the data store is adapted to provide information marked as being valid to a consuming platform.

6. The system of claim 1, wherein the compressed representation of the subset of industrial asset cyber-attack detection algorithm data combined with metadata comprises a trie.

7. The system of claim 6, wherein the compressed representation of the subset of industrial asset cyber-attack detection algorithm data combined with metadata comprises a Patricia-Merkle trie.

8. The system of claim 1, wherein the metadata includes at least one of: (i) a pseudo identifier, (ii) a time stamp, (iii) a unique client identifier, and (iv) data shape information.

9. The system of claim 1, wherein the verification platform is associated with at least one of: (i) a single network cloud-hosted topology, (ii) a multiple network cloud-hosted topology, and (iii) a participant hosted intranet environment.

10. The system of claim 1, wherein the secure, distributed ledger comprises blockchain technology.

11. A method associated with industrial asset cyber-attack detection algorithm verification, comprising:
   receiving, at a computer processor of a verification platform, a stream of industrial asset cyber-attack detection algorithm data, the industrial asset cyber-attacked detection algorithm data comprising at least time-series sensor data from one or more monitoring nodes of an industrial asset and including a subset of the industrial asset cyber-attack detection algorithm data;
   marking, by the verification platform, the subset of industrial asset cyber-attack detection algorithm data as invalid;
   storing, by the verification platform, the subset of industrial asset cyber-attack detection algorithm data and the corresponding marking as being invalid into a data store;
   recording, by the verification platform, a hash value associated with a compressed representation of the subset of industrial asset cyber-attack detection algorithm data combined with metadata in a secure, distributed ledger;
   receiving, at the verification platform, a transaction identifier from the secure, distributed ledger;
   independently create, by the verification platform, a version of the compressed representation of the subset of the industrial asset cyber-attack detection algorithm data combined with the metadata based on raw trie data received from a verification client, the raw trie data comprising a time series stream of sensor data output, marking the subset of industrial asset cyber-attack detection algorithm data in the data store as being valid after using the transaction identifier to verify, at the verification platform, that the recorded hash value matches a hash value associated with the independently created version of the compressed representation of the subset of industrial asset cyber-attack detection algorithm data combined with metadata;

receiving decision boundary information from an abnormal detection model, the decision boundary information representing a boundary between normal operating values and abnormal operating values, the abnormal operating values occurring during a cyber-attack, the abnormal detection algorithm receiving a stream of industrial data generated by a monitoring node;

comparing data points of the stream of industrial data to the decision boundary information; and generating at least one of a global alert signal or a local alert signal based on the result of the comparison.

12. The method of claim 11, wherein the compressed representation of the subset of industrial data combined with metadata comprises a Patricia-Merkle trie.

13. The method of claim 11, wherein the metadata comprises at least one of: (i) a pseudo identifier, (ii) a time stamp, (iii) a unique client identifier, and (iv) data shape information.

14. The method of claim 11, wherein the secure, distributed ledger comprises blockchain technology.

15. A system to facilitate industrial asset cyber-attack detection algorithm verification, comprising:
a verification client, including:
a data connection to receive a stream of industrial asset cyber-attack detection algorithm data, the industrial asset cyber-attacked detection algorithm data comprising at least time-series sensor data from one or more monitoring nodes of an industrial asset and including a subset of the industrial asset cyber-attack detection algorithm data, and
a verification client computer processor coupled to the data connection and adapted to:
create a Patricia-Merkle trie from the subset of the industrial asset cyber-attack detection algorithm data and metadata,
determine a hash trie value associated with the Patricia-Merkle trie,
receive a pseudo identifier from a verification engine, and
transmit raw Patricia-Merkle trie data to a verification server along with metadata,
the verification engine, including:
a verification engine computer processor adapted to:
receive the hash value from the verification client,
transmit a pseudo identifier to the verification client,
record the received hash trie value in a secure, distributed ledger,
receive a transaction identifier from the secure, distributed ledger, and
transmit the pseudo identifier and transaction identifier to the verification server, and
the verification server, including:
a verification server computer processor adapted to:
receive the subset of the industrial asset cyber-attack detection algorithm data and metadata from the verification client,
receive the pseudo identifier and transaction identifier from the verification engine,
mark the subset of industrial asset cyber-attack detection algorithm data as invalid,
store the subset of the industrial asset cyber-attack detection algorithm data and the corresponding marking as being invalid into a data store,
independently create a Patricia-Merkle trie from the received subset of the industrial asset cyber-attack detection algorithm data and metadata, the industrial asset cyber-attack detection algorithm data comprising a time series stream of sensor data output,
retrieve the recorded hash value from the secure, distributed ledger,
mark the subset of industrial asset cyber-attack detection algorithm data in the data store as being valid after verifying that the recorded hash value matches a hash value associated with the independently created Patricia-Merkle trie;
receive decision boundary information from an abnormal detection model, the decision boundary information representing a boundary between normal operating values and abnormal operating values, the abnormal operating values occurring during a cyber-attack, the abnormal detection algorithm receiving a stream of industrial data generated by a monitoring node;
compare data points of the stream of industrial data to the decision boundary information; and
generate at least one of a global alert signal or a local alert signal based on the result of the comparison.

16. The system of claim 15, wherein the metadata includes at least one of: (i) the pseudo identifier, (ii) a time stamp, (iii) a unique client identifier, and (iv) data shape information.

17. The system of claim 15, wherein the verification platform is associated with at least one of: (i) a single network cloud-hosted topology, (ii) a multiple network cloud-hosted topology, and (iii) a participant hosted intranet environment.

18. The system of claim 15, wherein the secure, distributed ledger comprises blockchain technology.

19. The system of claim 15, further comprising:
the data store, wherein the data store is adapted to provide information marked as being valid to a consuming platform.

20. The system of claim 19, further comprising:
the consuming platform adapted to utilize information marked as being valid in the data store.

* * * * *